US012714618B2

(12) United States Patent
Shami et al.

(10) Patent No.: US 12,714,618 B2
(45) Date of Patent: Aug. 25, 2026

(54) PATIENT CARE SYSTEM WITH POWER MANAGEMENT

(71) Applicant: Stryker Corporation, Portage, MI (US)

(72) Inventors: Zane Marwan Shami, Kalamazoo, MI (US); Scott A. Kuebler, Delton, MI (US); Krishna Sandeep Bhimavarapu, Kalamazoo, MI (US); Madhu Sandeep Thota, Portage, MI (US); Alexander Josef Bodurka, Portage, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/886,236

(22) Filed: Sep. 16, 2024

(65) Prior Publication Data

US 2025/0114259 A1 Apr. 10, 2025

Related U.S. Application Data

(62) Division of application No. 16/828,323, filed on Mar. 24, 2020, now Pat. No. 12,090,103.

(Continued)

(51) Int. Cl.

*A61G 7/018* (2006.01)
*A61G 7/012* (2006.01)

(Continued)

(52) U.S. Cl.

CPC ............. *A61G 7/018* (2013.01); *A61G 7/012* (2013.01); *A61G 7/015* (2013.01); *A61G 7/0515* (2016.11);

(Continued)

(58) Field of Classification Search

CPC ........ A61G 7/018; A61G 7/015; A61G 7/012; A61G 7/005; A61G 7/002; A61G 7/0515;

(Continued)

(56) References Cited

U.S. PATENT DOCUMENTS 10,420,687 B2 * 9/2019 Furman ................ A61G 7/0514
11,399,997 B2 * 8/2022 Furman ................ A61G 7/0506

(Continued)

FOREIGN PATENT DOCUMENTS

WO WO-2022051069 A1 * 3/2022 ............ G16H 40/60

*Primary Examiner* — Robert G Santos

(74) *Attorney, Agent, or Firm* — Gardner, Linn, Burkhart & Ondersma LLP

(57) ABSTRACT

A patient support apparatus, such as a bed, cot, stretcher, operating table, recliner, or the like, include a litter frame, a support deck, a battery, an AC connector for receiving electrical power, a plurality of motorized actuators, and a control system. The control system limits the amount of electrical power available to the motorized actuators to different levels depending upon whether the AC connector or the battery is powering the patient support apparatus. The control system may also or alternatively change the power available to the motorized actuators depending upon whether a mattress therapy is currently in progress or not. Still further, the control system may pause battery recharging during actuator movement, may utilize one or electronic fuses to control power delivery, and/or wake up sleeping (or shut down) microcontrollers using a specialized network transceiver command that cause the recipient transceiver to wake up its associated microcontroller.

9 Claims, 13 Drawing Sheets

Related U.S. Application Data

(60) Provisional application No. 62/823,324, filed on Mar. 25, 2019.

(51) Int. Cl.
*A61G 7/015* (2006.01)
*A61G 7/05* (2006.01)
*A61G 7/057* (2006.01)
*A61G 7/08* (2006.01)

(52) U.S. Cl.
CPC .......... *A61G 7/0524* (2016.11); *A61G 7/0528* (2016.11); *A61G 7/057* (2013.01); *A61G 7/08* (2013.01); *A61G 2203/34* (2013.01); *A61G 2203/36* (2013.01); *A61G 2203/726* (2013.01)

(58) Field of Classification Search
CPC .... A61G 7/0524; A61G 7/0528; A61G 7/057; A61G 7/08; A61G 2203/34; A61G 2203/36; A61G 2203/726
USPC ..................... 5/616–618, 613, 610, 611, 600
See application file for complete search history.

(56) References Cited

U.S. PATENT DOCUMENTS 11,801,178 B2 * 10/2023 Furman .................. A61G 7/005
12,090,103 B2 * 9/2024 Shami .................... A61G 7/057
12,097,153 B2 * 9/2024 Furman ..................... G05F 1/66
12,508,180 B2 * 12/2025 Bodurka ................ A61G 7/018
2016/0331614 A1 * 11/2016 Furman .................. A61G 7/018
2020/0046586 A1 * 2/2020 Furman .................. A61G 7/005
2020/0306115 A1 * 10/2020 Shami .................. A61G 7/0528
2022/0387235 A1 * 12/2022 Furman ................ A61G 7/0524
2023/0233388 A1 * 7/2023 Bodurka ................ A61G 7/018 700/275
2024/0058189 A1 * 2/2024 Furman .................. A61G 7/015
2025/0114259 A1 * 4/2025 Shami ................ A61G 7/05769

* cited by examiner

PATIENT CARE SYSTEM WITH POWER MANAGEMENT

CROSS-REFERENCE TO RELATED APPLICATIONS

This application claims priority to U.S. patent application Ser. No. 16/828,323 filed Mar. 24, 2020, by inventors Zane Shami et al. and entitled PATIENT CARE SYSTEM WITH POWER MANAGEMENT, now U.S. Pat. No. 12,090,103, which in turn claims priority to U.S. provisional patent application Ser. No. 62/823,324 filed Mar. 25, 2019, by inventors Zane Shami et al. and entitled PATIENT CARE SYSTEM WITH POWER MANAGEMENT, the complete disclosures of both of which are incorporated herein by reference.

BACKGROUND

The present disclosure relates to patient support apparatuses, such as, but not limited to, beds, cots, stretchers, recliners, chairs, and the like; and more particularly to the electrical power supply for the various components of the patient support apparatus.

Modern day patient support apparatuses often utilize a large number of microcontrollers, actuators, motors, and other electrical components that consume electricity. Ensuring that such components receive sufficient electrical power when needed while keeping the costs of the power delivery subsystem of the patient support apparatus to an acceptable level presents a difficult engineering task in which simply increasing the internal power supply of the patient support apparatus generally results in increased costs, size, and/or weight, while decreasing the internal power supply generally results in reduced functionality and/or the difficult engineering task of designing a power delivery subsystem that decides what components get power when, and manages the implementation details of those decisions in an effective and cost-conscious manner. Previous patient support apparatus power delivery subsystems have left room for improvement in this area.

SUMMARY

In its various embodiments, the present disclosure provides a patient support apparatus having a control system that manages the delivery of electrical power to the apparatus's various electrical components in a cost-effective, efficient, and timely manner. The control system manages the power delivery process both when the patient support apparatus is operating on battery power and when the patient support apparatus is plugged into an external source of electrical power, such as a conventional Alternating Current (AC) power outlet. When the power demand exceeds the currently available power capacity, the control system rations the power to the various components in an efficient and timely manner that reduces the impact on the user of the patient support apparatus such that the power rationing is either invisible to the user or done so in a manner that reduces the impact on the user. The control system is also designed in a manner that is easy to assemble with little room for error during the manufacturing process, that extends battery life, and that can be modified via software updates after the patient support apparatus has been installed at a customer's site.

According to one embodiment of the present disclosure, a patient support apparatus is provided that includes a litter frame, a support deck, an alternating current (AC) connector, a battery, a motorized actuator, and a control system. The support deck is supported on the litter frame and adapted to support a patient thereon. The AC connector is adapted to receive electrical power from an AC outlet. The battery provides electrical power to the patient support apparatus. The motorized actuator moves at least a portion of the support deck, and the control system controls the motorized actuator and receives electrical power from the AC connector or the battery. The control system is adapted to limit an amount of electrical current supplied to the motorized actuator to a first limit when the control system is receiving electrical power from the AC connector, and to limit an amount of electrical current supplied to the motorized actuator to a second limit when the control system is receiving electrical power from the battery. The second limit is lower than the first limit.

According to another aspect of the present disclosure, the control system limits electrical current supplied to the motorized actuator to the first limit by limiting movement of the motorized actuator to a first maximum speed. In such embodiments, the control system limits electrical current supplied to the motorized actuator to the second limit by limiting movement of the motorized actuator to a second maximum speed.

In some embodiments, the control system moves the motorized actuator when the control system is receiving electrical power from the AC connector by sending a first motion command to the motorized actuator, and the control system moves the motorized actuator when the control system is receiving electrical power from the battery by sending a second motion command to the motorized actuator. The second motion command corresponds to a slower speed than the first motion command.

The control system, in some embodiments, is further adapted to limit electrical current supplied to the motorized actuator to a third limit when the control system is receiving electrical power from the battery and the battery has a charge level below a first threshold. The third limit is smaller than the second limit.

According to other embodiments, the control system further comprises a mattress control board adapted to control a mattress positioned on top of the support deck. The mattress has a therapy state in which the mattress control board controls the mattress to provide a therapy for the patient and a non-therapy state in which the mattress control board does not provide the therapy for the patient. In such embodiments, the control system is further adapted to limit the amount of electrical current supplied to the motorized actuator to the first limit when the mattress is in the non-therapy state and the control system is receiving electrical power from the AC connector. The control system if further adapted to limit the amount of electrical current supplied to the motorized actuator to a third limit when the mattress is in the therapy state and the control system is receiving electrical power from the AC connector. In some of these embodiments, the third limit is greater than the second limit but less than the first limit.

In some embodiments, when the control system is receiving electrical power from the battery, the control system determines a charge state of the battery and, if the charge state is below a first threshold, cuts off electrical power to the motorized actuator but keeps supplying electrical power to a user interface. In such embodiments, the control system may cut off electrical power to the user interface and shut down the patient support apparatus if the charge state of the battery falls below a second threshold. The second threshold is lower than the first threshold.

A charging circuit is included in some embodiments that is adapted to charge the battery when the control system is receiving electrical power from the AC connector. In such embodiments, the control system is further adapted to pause the charging of the battery when the control system is receiving electrical power from the AC connector and the motorized actuator is being driven.

In some embodiments, a plurality of electronic fuses are included with the control system. A first one of the electronic fuses is coupled between a main control board of the control system and a mattress control board. A second one of the electronic fuses is coupled between the main control board and a motion control board, and a third one of the electronic fuses is coupled between the main control board and a display control board. The main control board may be adapted to limit an amount of electrical current supplied to at least one of the mattress control board, motion control board, or display control board by sending a signal to a respective one of the first, second, or third electronic fuses. The electronic fuse responds to the signal by limiting the power it delivers to the respective control board.

In some embodiments, a first cable connector adapted to couple a first cable from the main control board to the mattress control board is provided. In such embodiments, a second cable connector adapted to couple a second cable from the main control board to the motion control board may also be provided, as well as a third cable connector adapted to couple a third cable from the main control board to the display control board. Each of the first, second, and third cable connectors have unique geometric constructions with respect to each other such that the first cable cannot be coupled to the second or third cable connectors, the second cable cannot be coupled to the first or third cable connectors, and the third cable cannot be coupled to the first or second cable connectors.

The control system further comprises, in some embodiments, a main control board, a mattress control board, and a display control board. The main control board communicates with a battery monitor adapted to determine a charge state of the battery. The mattress control board controls a mattress positioned on top of the support deck and includes a mattress microcontroller and a mattress transceiver adapted to receive messages from the main control board. The motion control board controls movement of the motorized actuator and includes a motion microcontroller and a motion transceiver adapted to receive messages from the main control board. The display control board controls content displayed on a display of a user interface and includes a display microcontroller and a display transceiver adapted to receive messages from the main control board. The main control board is further adapted to send a sleep message to at least one of the mattress transceiver, the motion transceiver, or the display transceiver when the charge state of the battery falls below a first threshold. The sleep message causes the respective mattress microcontroller, motion microcontroller, or display microcontroller to shut down and/or go to sleep. The main control board may be further adapted to send a wake message to at least one of the mattress transceiver, the motion transceiver, or the display transceiver when the charge state of the battery exceeds the first threshold. The wake message causes the respective mattress transceiver, motion transceiver, or display transceiver to wake up the respective sleeping mattress microcontroller, motion microcontroller, or display microcontroller.

In some embodiments, the wake message and sleep message are transmitted over a Controller Area Network (CAN) and the mattress transceiver, motion transceiver, and display transceiver are all CAN transceivers.

According to another embodiment of the present disclosure, a patient support apparatus is provided that includes a litter frame, a support deck, an AC connector, a plurality of motorized actuators, a mattress control board, and a main control board. The support deck is supported on the litter frame and is adapted to support a patient thereon. The AC connector is adapted to receive electrical power from an AC outlet. The plurality of motorized actuators are adapted to move a plurality of components of the patient support apparatus. The mattress control board controls a mattress positioned on top of the support deck that has a therapy state and a non-therapy state. In the therapy state, the mattress control board controls the mattress to provide a therapy for the patient; and in the non-therapy state, the mattress control board controls the mattress such that it does not provide the therapy for the patient. The main control board includes a main microcontroller adapted to control the motorized actuators and to receive electrical power from the AC connector. The main microcontroller limits an amount of electrical current supplied to the plurality of motorized actuators to a first limit when the mattress is in the non-therapy state and the main control board is receiving electrical power from the AC connector. The main microcontroller also limits the amount of electrical current supplied to the plurality of motorized actuators to a second limit when the mattress is in the therapy state and the main control board is receiving electrical power from the AC connector. The second limit is smaller than the first limit.

In some embodiments, the patient support apparatus further comprises a motion control board having a motion microcontroller and a motion transceiver adapted to receive messages from the main control board. The motion microcontroller is adapted to send a motion command to each of the plurality of motorized actuators to drive the motorized actuators. In such embodiments, the main microcontroller limits the amount of electrical current supplied to the plurality of motorized actuators to the second limit by instructing the motion microcontroller to send modified speed commands to the plurality of motorized actuators. The modified speed commands specify a lower speed than speed commands that are sent by the motion microcontroller to the plurality of motorized actuators when the mattress is in the non- therapy state. Alternatively, the main microcontroller may send the same speed commands to the motion controller regardless of the mattress state and limit the amount of electrical current supplied to the plurality of motorized actuators by setting a maximum limit to the amount of electrical current that is delivered to the motion control board. The maximum limit is set, in some embodiments, by utilizing a motion control board electronic fuse. The main microcontroller sends a control signal to the motion control board electronic fuse that causes the motion control board electronic fuse to limit the amount of electrical current supplied it supplies to the motion control board.

In other embodiments, the patient support apparatus further includes a battery adapted to supply electrical power to the main control board when the AC connector is not coupled to the AC outlet; and a charging circuit adapted to charge the battery when the main control board is receiving electrical power from the AC connector. In such embodiments, the main control board is further adapted to pause the charging of the battery when the main control board is receiving electrical power from the AC connector and the motion control board is driving at least one of the motorized actuators.

A plurality of wheels adapted to support the litter frame are provided in some embodiments. At least one of the wheels is motorized and part of a propulsion system adapted to drive the patient support apparatus. The propulsion system includes a propulsion control board adapted to drive the motorized wheel (or wheels) and a propulsion battery adapted to provide power to motorized wheel. The main control board pauses the charging of the propulsion battery when the main control board is receiving electrical power from the AC connector and the motion control board is driving at least one of the motorized actuators.

In some embodiments, the main microcontroller is further adapted to limit an amount of electrical current supplied to the plurality of motorized actuators to a third limit when the main control board is receiving electrical power from the battery. The third limit may be less than both the second limit and the first limit.

The main control board, in some embodiments, determines a charge state of the battery and, if the charge state is below a first threshold, cuts off electrical power to the motorized actuators but keeps supplying electrical power to a user interface (when the patient support apparatus is operating on battery power). The main control board may also cut off electrical power to the user interface and shut down the patient support apparatus if the charge state of the battery falls below a second threshold that is lower than the first threshold.

According to another embodiment of the present disclosure, a patient support apparatus is provided that includes a litter frame, a support deck, a plurality of motorized actuators, a user interface, a main control board, a mattress control board, a motion control board, a display control board, a mattress control board electronic fuse, a motion control board electronic fuse, and a display control board electronic fuse. The support deck is supported on the litter frame and adapted to support a patient thereon. The motorized actuators are adapted to move a plurality of components of the patient support apparatus. The user interface includes a display for displaying information to a user. The main control board includes a main microcontroller. The mattress control board is adapted to control a mattress positioned on top of the support deck, and includes a mattress microcontroller and a mattress transceiver adapted to receive messages from the main control board used to control the mattress. The motion control board is adapted to control movement of the motorized actuators and includes a motion microcontroller and a motion transceiver adapted to receive messages from the main control board used to control the plurality of motorized actuators. The display control board is adapted to control content displayed on the display of the user interface and includes a display microcontroller and a display transceiver adapted to receive messages from the main control board used to control the display. The mattress control board electronic fuse is adapted to limit an amount of electrical power supplied to the mattress control board in response to a first control signal from the main microcontroller. The motion control board electronic fuse is adapted to limit an amount of electrical power supplied to the motion control board in response to a second control signal from the main microcontroller, and the display control board electronic fuse is adapted to limit an amount of electrical power supplied to the display control board in response to a third control signal from the main microcontroller.

According to other aspects of the present disclosure, the main microcontroller is further adapted to limit the amount of electrical current supplied to the motion control board to a first limit when the main control board is receiving electrical power from an AC connector, and to limit an amount of electrical current supplied to the motion control board to a second limit when the main control board is receiving electrical power from the battery. The second limit is lower than the first limit. In some embodiments, the main microcontroller limits the amount of electrical current supplied to the motion control board to the first limit by sending a first signal to the motion control board electronic fuse, and the main microcontroller limits the amount of electrical current supplied to the motion control board to the second limit by sending a second signal to the motion control board electronic fuse.

In some embodiments, the main microcontroller is further adapted to limit the amount of electrical current supplied to the motion control board to a first limit when a mattress is in a non-therapy state and the main control board is receiving electrical power from the AC connector, and to limit the amount of electrical current supplied to the motion control board to a second limit when the mattress is in a therapy state and the main control board is receiving electrical power from the AC connector. The second limit is smaller than the first limit.

The main controller, in some embodiments, is further adapted to pause the charging of the battery when the main control board is receiving electrical power from the AC connector and the motion control board is driving at least one of the motorized actuators. The main controller may additionally or alternatively be adapted to pause the charging of a separate propulsion system battery when the main control board is receiving electrical power from the AC connector and the motion control board is driving at least one of the motorized actuators.

Keyed, or otherwise unique, cable connectors may be used for coupling the main control board to the plurality of other control boards. For example, the patient support apparatus may include a first cable connector adapted to couple a first cable from the main control board to the mattress control board, a second cable connector adapted to couple a second cable from the main control board to the motion control board, and a third cable connector adapted to couple a third cable from the main control board to the display control board, wherein each of the first, second, and third cable connectors have a different geometric construction from each other such that the first cable cannot be coupled to the second or third cable connectors, the second cable cannot be coupled to the first or third cable connectors, and the third cable cannot be coupled to the first or second cable connectors.

In some embodiments, the main microcontroller is further adapted to determine a charge state of the battery and, if the charge state is below a first threshold, to send a sleep message to at least one of the mattress transceiver, the motion transceiver, or the display transceiver. The sleep message causes the respective mattress microcontroller, motion microcontroller, or display microcontroller to shut down. The main microcontroller is further adapted to send a wake message to any of the mattress transceiver, the motion transceiver, or the display transceiver that is asleep when the charge state of the battery exceeds the first threshold. The wake message causes the respective mattress transceiver, motion transceiver, or display transceiver to wake up the corresponding mattress microcontroller, motion microcontroller, or display microcontroller.

According to another embodiment of the present disclosure, a patient support apparatus is provided that includes a litter frame, a support deck, a plurality of motorized actuators, a user interface, a main control board, a mattress control board, a motion control board, a display control board, a first cable connector, a second cable connector, and a third cable connector. The mattress control board is adapted to control a mattress positioned on top of the support deck and includes a mattress microcontroller and a mattress transceiver adapted to receive messages from the main control board used to control the mattress. The motion control board is adapted to control movement of the plurality of motorized actuators and includes a motion microcontroller and a motion transceiver adapted to receive messages from the main control board used to control the plurality of motorized actuators. The display control board is adapted to control content displayed on the display of the user interface and includes a display microcontroller and a display transceiver adapted to receive messages from the main control board used to control the display. The first cable connector is adapted to couple a first cable from the main control board to the mattress control board. The second cable connector is adapted to couple a second cable from the main control board to the motion control board, and the third cable connector is adapted to couple a third cable from the main control board to the display control board. Each of the first, second, and third cable connectors have a different geometric construction from each other such that the first cable cannot be coupled to the second or third cable connectors, the second cable cannot be coupled to the first or third cable connectors, and the third cable cannot be coupled to the first or second cable connectors.

The main controller, in some embodiments, is further adapted to pause the charging of a battery when the main control board is receiving electrical power from the AC connector and the motion control board is driving at least one of the motorized actuators. The main controller may also, or alternatively, be adapted to pause the charging of a separate propulsion battery when the main control board is receiving electrical power from the AC connector and the motion control board is driving at least one of the motorized actuators.

In some embodiments, the mattress control board is adapted to control the mattress in at least two different states: a therapy state and a non-therapy state. In the therapy state, the mattress control board controls the mattress to provide a therapy for the patient. In the non-therapy state, the mattress control board controls the mattress so that it does not provide the therapy for the patient. The main microcontroller is further adapted to limit the amount of electrical current supplied to the motion control board to a first limit when the mattress is in the non-therapy state and the main control board is receiving electrical power from the AC connector, and to limit the amount of electrical current supplied to the motion control board to a second limit when the mattress is in the therapy state and the main control board is receiving electrical power from the AC connector. The second limit is smaller than the first limit.

According to another embodiment of the present disclosure, a patient support apparatus is provided that includes a litter frame, a support deck, a user interface, an AC connector, a battery, a main control board, a mattress control board, a motion control board, and a display control board. The user interface includes a display for displaying information to a user. The AC connector is adapted to receive electrical power from an AC outlet and the battery is adapted to provide power to the patient support apparatus when the AC connector is not coupled to an AC outlet. The mattress control board is adapted to control a mattress positioned on top of the support deck and includes a mattress microcontroller and a mattress transceiver adapted to receive messages from the main control board used to control the mattress. The motion control board is adapted to control movement of the plurality of motorized actuators and includes a motion microcontroller and a motion transceiver adapted to receive messages from the main control board used to control the plurality of motorized actuators. The display control board is adapted to control content displayed on the display of the user interface and includes a display microcontroller and a display transceiver adapted to receive messages from the main control board used to control the display. The main microcontroller determines a charge state of the battery and, if the charge state is below a first threshold, sends a sleep message to at least one of the mattress transceiver, the motion transceiver, or the display transceiver. The sleep message causes the respective mattress microcontroller, motion microcontroller, or display microcontroller to shut down.

According to other aspects of the present disclosure, the main microcontroller is further adapted to send a wake message to at least one of the mattress transceiver, the motion transceiver, or the display transceiver when the charge state of the battery exceeds the first threshold. The wake message causes the respective mattress transceiver, motion transceiver, or display transceiver to wake up the respective mattress microcontroller, motion microcontroller, or display microcontroller.

In some embodiments, both the wake message and the sleep message are transmitted over a Controller Area Network (CAN) and the mattress transceiver, motion transceiver, and display transceiver are all CAN transceivers.

The main microcontroller, in some embodiments, cuts off electrical power to the mattress control board when the main control board is receiving electrical power from the battery, but keeps supplying electrical power to the display control board if the charge state of the battery falls below a first threshold. If the charge state of the battery falls below a second and lower threshold, the main microcontroller may send a sleep message to the motion control board to cause the motion microcontroller to go to sleep.

In some embodiments, when the main control board is receiving electrical power from the battery, if the charge state of the battery falls below the second threshold, the main microcontroller sends a sleep message to the mattress control board and causes the mattress microcontroller to shut down. Still further, when the main control board is receiving electrical power from the battery, if the charge state of the battery falls below a third threshold, the main microcontroller may also send the sleep message to the display control board and causes the display microcontroller to shut down. The third threshold is lower than both the first and second thresholds.

One or more siderail controllers having siderail transceivers may also be in communication with main control board. In some of such embodiments, the main microcontroller is adapted to send a sleep message to the siderail transceiver when the siderail is moved to a lowered position, and to send a wake message to the siderail transceiver when the siderail is moved to a raised position. The sleep and wake messages cause the siderail microcontroller to shut off and turn on, respectively.

Still further, in some embodiments, the main microcontroller is configured to send a sleep message to the display board transceiver when a lid on the display is moved to a lowered position that conceals the display, and to send a wake message to the display board transceiver when the lid is moved back to a raised position. The sleep and wake message cause the display microcontroller to shut off and turn on, respectively.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
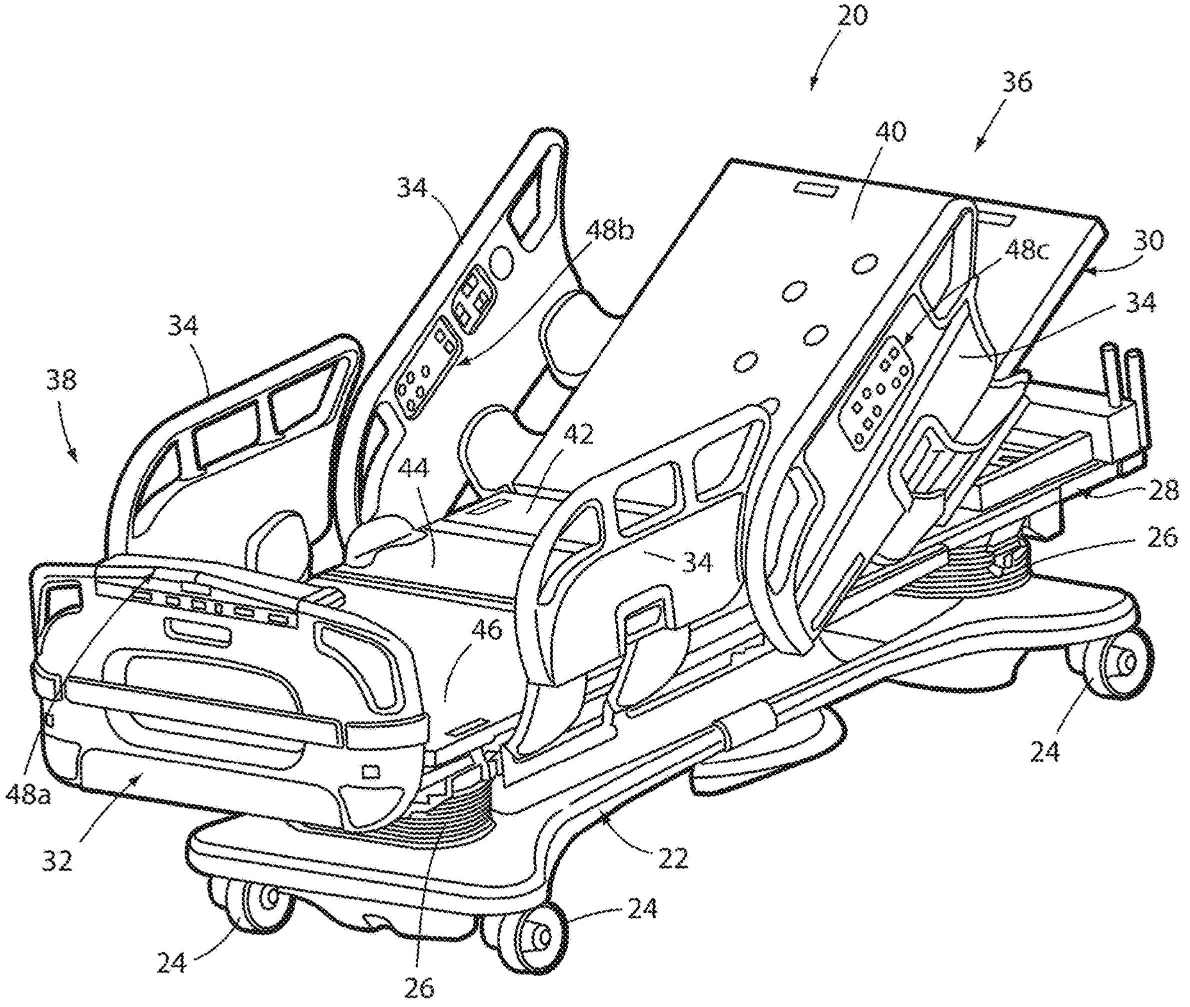
FIG. 1 is perspective view of a patient support apparatus into which one or more of the features of the present disclosure may be incorporated.

A patient support apparatus 20 according to one embodiment of the present disclosure is shown in FIG. 1. Although the particular form of patient support apparatus 20 illustrated in FIG. 1 is a bed adapted for use in a hospital or other medical setting, it will be understood that the patient support apparatus 20 could, in different embodiments, be a cot, a stretcher, a gurney, a recliner, or any other structure capable of supporting a patient that may be used during times when the patient is not accompanied by a caregiver. For purposes of the following written description, the patient support apparatus 20 will be described as a bed with the understanding the following written description applies to these other types of patient support apparatuses.

In general, the patient support apparatus 20 includes a base 22 having a plurality of wheels 24, a lift subsystem comprising a pair of lifts 26 supported on the base, a litter frame 28 supported on the lifts 26, and a support deck 30 supported on the litter frame 28. Patient support apparatus 20 further includes a headboard (not shown), a footboard 32, and a plurality of siderails 34. Siderails 34 are all shown in a raised position in FIG. 1 but are each individually movable to a lower position in which ingress into, and egress out of, patient support apparatus 20 is not obstructed by the lowered siderails 34. In some embodiments, the siderails 34 may be moved to one or more intermediate positions as well.

Lifts 26 are adapted to raise and lower litter frame 28 with respect to base 22. Lifts 26 may be hydraulic actuators, electric actuators, or any other suitable device for raising and lowering litter frame 28 with respect to base 22. In the illustrated embodiment, lifts 26 are operable independently so that the tilting of litter frame 28 with respect to base 22 can also be adjusted. That is, litter frame 28 includes a head end 36 and a foot end 38, each of whose height can be independently adjusted by the nearest lift 26. The patient support apparatus 20 is designed so that when an occupant lies thereon, his or her head will be positioned adjacent head end 36 and his or her feet will be positioned adjacent foot end 38.

Litter frame 28 provides a structure for supporting support deck 30, the headboard, footboard 32, and siderails 34. Support deck 30 provides a support surface for a mattress (not shown in FIG. 1), or other soft cushion, so that a person may lie and/or sit thereon. The support deck 30 is made of a plurality of sections, some of which are pivotable about generally horizontal pivot axes. In the embodiment shown in FIG. 1, the support deck 30 includes a head section 40, a seat section 42, a thigh section 44, and a foot section 46. Head section 40, which is also sometimes referred to as a Fowler section, is pivotable about a generally horizontal pivot axis between a generally horizontal orientation (not shown in FIG. 1) and a plurality of raised positions (one of which is shown in FIG. 1). Thigh section 44 and foot section 46 may also be pivotable about generally horizontal pivot axes.

Patient support apparatus 20 further includes a plurality of user interfaces or control panels 48 that enable a user of patient support apparatus 20, such as a patient and/or an associated caregiver, to control one or more aspects of patient support apparatus 20. In the embodiment shown in FIG. 1, patient support apparatus 20 includes a footboard control panel **48*a*, a pair of inner siderail patient control panels 48*b* (only one of which is visible), and a pair of outer siderail caregiver control panels 48*c* (only one of which is visible). Footboard control panel 48*a* and outer siderail control panels 48*c* are intended to be used by caregivers, or other authorized personnel, while inner siderail control panels 48*b* are intended to be used by the patient associated with patient support apparatus 20**.

Not all of the control panels 48 include the same controls and/or functionality. In the illustrated embodiment, footboard control panel 48*a* includes a substantially complete set of controls for controlling patient support apparatus 20 while control panels 48*b* and 48*c* include a selected subset of those controls. Control panels 48 may include controls for allowing a user to do one or more of the following: change a height of support deck 30, raise or lower head section 40, activate and deactivate a brake for wheels 24, arm an exit detection system, take a weight reading of the patient, activate and deactivate a propulsion system, and communicate with a healthcare facility computer network installed in the healthcare facility in which patient support apparatus 20 is positioned. Inner siderail control panels 48*b* may also include a nurse call control that enables a patient to call a nurse. A speaker and microphone are included in order to allow the patient to orally communicate with the remotely positioned nurse.

The controls for carrying out any of the aforementioned functions may be implemented as buttons, dials, switches, or other devices. Any of control panels 48*a-c* may also include a display for displaying information regarding patient support apparatus 20. The display is a touchscreen in some embodiments, and may include one or more control icons for carrying out any of the control functions described herein.

The mechanical construction of those aspects of patient support apparatus 20 not explicitly described herein may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that those aspects of patient support apparatus 20 not explicitly described herein can alternatively be designed with other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of those aspects of patient support apparatus 20 not explicitly described herein may also take on forms different from what is disclosed in the aforementioned references.

Figure 2:
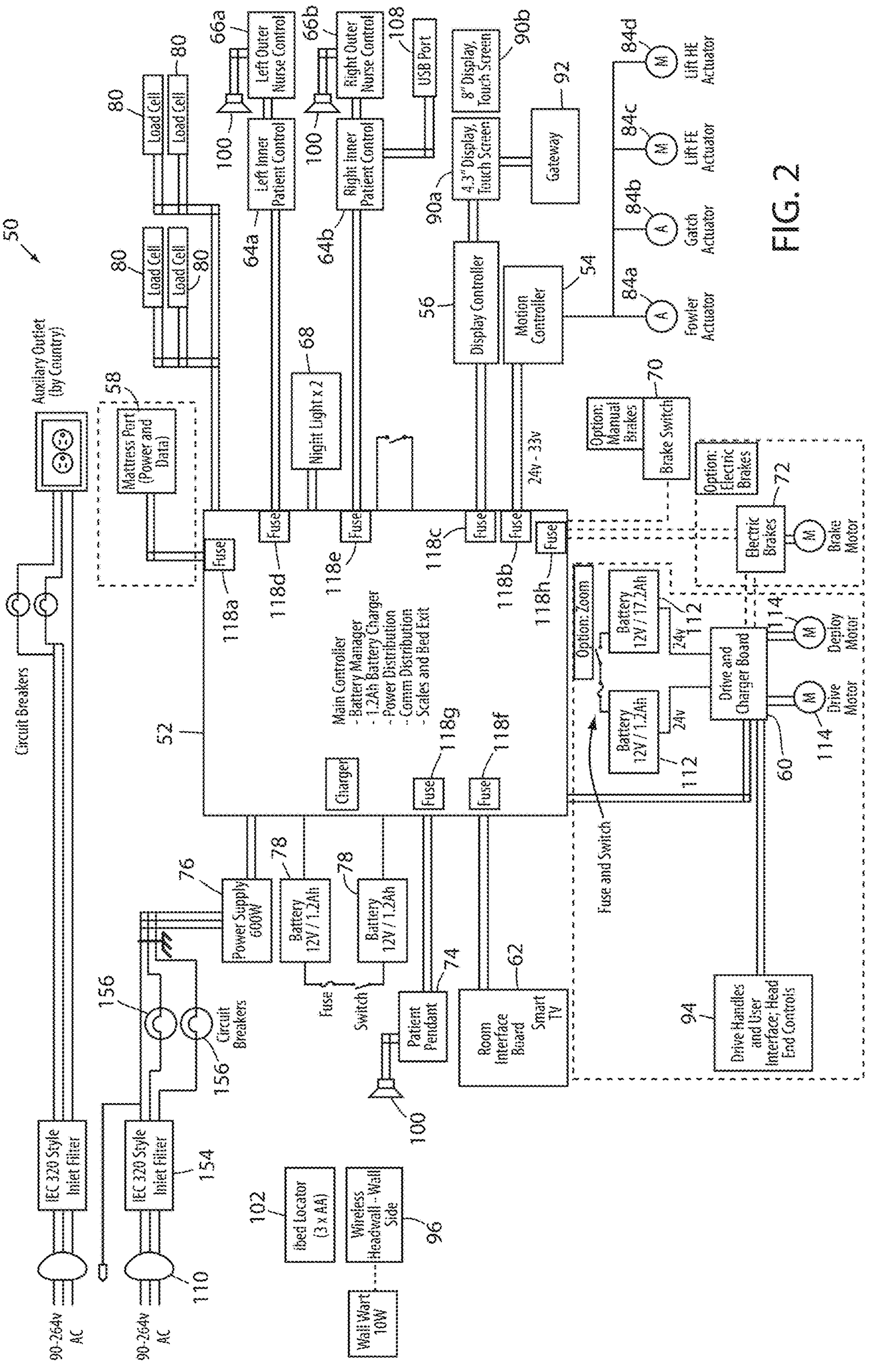
FIG. 2 is a diagram of one embodiment of a control system that may be used with the patient support apparatus of FIG. 1.

Referring now to FIG. 2, patient support apparatus 20 includes a control system 50 that controls the various electrical and mechanical functions of patient support apparatus 20. Control system 50 includes a main control board 52 electrically coupled to a plurality of other control boards, including a motion control board 54, a display control board 56, a mattress control board 58, a propulsion control board 60, a room interface board 62, a left inner siderail control panel board 64*a*, a right inner siderail control panel board 64*b*, a left outer siderail control panel board 66*a*, and a right outer siderail control panel board 66*b*. All of these boards communicate with main control board 52 over one or more internal network communication buses and/or protocols, such as, but not limited to, one or more Controller Area Network (CAN) buses that operate in accordance with one or more of the ISO standards 11898-1, 11898-2, and/or 11898-3. Alternatively, or additionally, two or more boards of control system 50 may communicate using the CAN FD 1.0 (Flexible Data-Rate) standard. Still further, some of the boards of control system may alternatively or additionally communicate using the Local Interconnect Network (LIN) serial network protocol. Indeed, in some embodiments, two or more of the boards of control system 50 may translate messages from one protocol to another, such as is disclosed in commonly assigned U.S. patent application Ser. No. 15/903,477 filed Feb. 23, 2018, by inventors Krishna Bhimavarapu et al. and entitled PATIENT CARE DEVICES WITH ON-BOARD NETWORK COMMUNICATION, the complete disclosure of which is hereby incorporated herein by reference.

In addition to the aforementioned electrical boards, main control board 52 of control system 50 is also adapted to communicate with the following: a night light 68, a brake switch 70, an electric brake 72, a patient pendant 74, and a power supply 76. Main control board 52 also receives electrical power from a pair of main batteries 78. Still further, main control board 52 is in communication with four load cells 80 that are part of a scale/exit detection system.

As will be discussed in more detail with respect to FIG. 3, main control board 52 includes at least one main microcontroller 82 that oversees the operation of patient support apparatus 20. Main microcontroller 82 also oversees the distribution of electrical power to the various components of patient support apparatus 20. In general, main control board 52 receives electrical power from either batteries 78 or power supply 76, which is adapted to be coupled to a conventional AC wall outlet, and main control board 52 controls the distribution of that electrical power to the various boards and components with which main control board 52 is in communication. The manner in which main microcontroller 82 oversees this power distribution will be discussed in greater detail below. Before proceeding to that discussion, however, the boards and other components of control system 50 will now be described.

Motion control board 54 (FIGS. 2-3) includes at least one motion microcontroller 86 that controls the movement of those components of patient support apparatus 20 that are able to be moved on patient support apparatus 20. In the embodiment shown in FIG. 2, motion control board 54 communicates with four motorized actuators 84. These include a Fowler actuator 84*a*, a gatch actuator 84*b*, a foot end lift actuator 84*c*, and a head end lift actuator 84*d*. Fowler actuator 84*a* controls the pivoting of head section (also known as a Fowler section) 40 of support deck 30 about a generally horizontal pivot axis. Gatch actuator 84*b* controls the raising and lowering of the joint between thigh section 44 and foot section 46 of support deck 30. Gatch actuator 84*b* therefore raises and lowers the patient's knees when the patient is lying on a mattress positioned on top of support deck 30. Foot end lift actuator 84*c* controls the upward and downward movement of the lift 26 positioned toward foot end 38 of patient support apparatus 20. Head end lift actuator 84*d* controls the upward and downward movement of the lift 26 positioned toward head end 36 of patient support apparatus 20.

Motorized actuators 84 of control system 50 may be linear actuators, rotary actuators, or other types of actuators capable of raising, lowering, and/or pivoting the components of patient support apparatus 20 to which they are coupled. Actuators 84 are electrically powered in the illustrated embodiments, but may alternatively be implemented as hydraulic, electro-hydraulic, pneumatic, or the like. Actuators 84 are controlled by one or more controls positioned on one or more of the control panels 48*a*-48*c*. In some embodiments, one or more of the actuators 84 are implemented in any of the manners disclosed in commonly assigned U.S. patent application Ser. No. 15/449,277 filed Mar. 3, 2017 by inventors Aaron Furman et al. and entitled PATIENT SUPPORT APPARATUS WITH ACTUATOR FEEDBACK, the complete disclosure of which is incorporated herein by reference. Other types of actuators may of course be used.

Motion microcontroller 86 (FIG. 3) controls the movement of the motors within actuators 84 by sending a pulse width modulated (PWM) signal to the motors in response to a user activating one of the actuator controls on one or more of the control panels 48. By changing the duty cycle of the PWM signals sent to the motor, motor microcontroller 86 is able to control the speed of the motor. In some embodiments, motor microcontroller 86 controls the operation of each motor of each actuator 84 using an H-bridge of the type disclosed in commonly assigned U.S. patent application Ser. No. 14/838,693 filed Aug. 28, 2015, by inventors Daniel Brosnan et al. and entitled PERSON SUPPORT APPARATUS WITH ACTUATOR BRAKE CONTROL, the complete disclosure of which is incorporated herein by reference. Motor microcontroller 86 may utilize the braking technique disclosed in the aforementioned '693 application, or it may use another braking technique. Still further, motor microcontroller 86 may control the motors of actuators 84 in manners other than using PWM signals and/or in other manners than what is disclosed in the aforementioned '693 application.

Display control board 56 includes at least one display microcontroller 88 that oversees the content displayed on a display 90 of at least one of the control panels 48. Display 90 may be positioned at any one or more of the three control panels 48*a-c*. As shown in FIG. 2, display 90 may take on a variety of different sizes, such as a display 90*a* having a 4.3 inch diagonal dimension, or a display 90*b* having an 8 inch diagonal dimension. Other sized displays can, of course, be used. In those embodiments of patient support apparatus 20 in which display 90 is implemented as a touchscreen, it also is configured to send commands and information back to main control board 52 indicating which touch screen controls have been activated by a user. In the particular embodiment of display control board 56 shown in FIG. 2, display control board 56 is in communication with a network transceiver board 92. Network transceiver board 92 includes a wired or wireless network transceiver (e.g. Ethernet port or WiFi radio) adapted to communicate with the healthcare facility's local area network. Data received from network transceiver board 92 is forwarded to main control board 52 for processing, and main control board 52 is further adapted to send data to network transceiver board 92 for forwarding to one or more servers in communication with the healthcare facility's local area network.

In some embodiments, patient support apparatus 20 communicates with a patient support apparatus server (not shown) via the wireless access points often positioned throughout a typical healthcare facility. In some embodiments, the patient support apparatus server is a server commercially offered for sale by Stryker Medical of Kalamazoo, Mich. In other embodiments, the patient support apparatus server is a different type of server. Regardless of its specific type, the patient support apparatus server coordinates communications between the various patient support apparatuses 20 in a healthcare facility and any of the other applications or servers that are present on the local area network. Thus, the patient support apparatus server receives communications from patient support apparatuses 20 and then forwards—or makes available—information from those communications to selected entities on the local area network, as appropriate.

Mattress control board 58 is adapted to control the operation of a powered mattress positioned on top of support deck 30. The powered mattress may take on a variety of different forms. In at least one embodiment, the powered mattress is constructed in accordance with any of the powered mattresses disclosed in either of the following commonly assigned U.S. Pat. No. 9,468,307 issued Oct. 18, 2016, to Lafleche et al. and entitled INFLATABLE MATTRESS AND CONTROL METHODS; and U.S Pat. No. 9,782,312 issued Oct. 10, 2017, to Brubaker et al. and entitled PATIENT SUPPORT, the complete disclosures of both of which are incorporated herein by reference. Still other powered mattresses are able to be used. Further, in some embodiments, mattress control board 58 is adapted to control a plurality of different types of powered mattresses and includes a sensor for detecting the type of mattress supported on support deck 30, as well a mattress microcontroller 138 with corresponding programming to carry out the control of the specific type of mattress detected.

When controlling the mattress positioned on top of support deck 30, mattress control board 58 communicates with the mattress by way of a serial cable that couples between mattress control board 58 and the mattress. In some embodiments, the serial cable is a USB cable, while in other embodiments a different type of cable is used. In still other embodiments, mattress control board 58 may wirelessly communicate with the mattress using any known wireless communication technique, including, but not limited to, inductive communication. One example of a mattress control board on a bed that uses inductive communication with a mattress positioned on top of the bed is disclosed in commonly assigned U.S. Pat. No. 9,289,336 issued Mar. 22, 2016, to inventors Clifford Lambarth et al. and entitled PATIENT SUPPORT WITH ENERGY TRANSPORT, the complete disclosure of which is incorporated herein by reference. Mattress control board 58 may be configured to implement the inductive communication techniques disclosed in this '336 patent.

Regardless of the physical communication method between mattress control board 58 and the powered mattress, mattress control board 58 is configured to put the mattress into at least two different states: a therapy state and a non-therapy state. In the therapy state, the mattress is carrying out one or more therapies on the patient. Such therapies may include, but are not limited to, rotational therapy, turning therapy, and percussion therapy. In general, any therapy that requires the mattress to run an air pump or blower in order to change the inflation of one or more bladders within the mattress will cause the mattress to be in a state that is considered a "therapy state" for purposes of the description herein. Further, for purposes of the description herein, the "non-therapy state" refers to the mattress when the air pump or blower is not being used. The therapy state generally consumes significantly more electricity than the non-therapy state due to the operation of the air pump or blower. Mattress control board 58 communicates the current state of the mattress (therapy or non-therapy state) to main control board 52 and, as will be discussed more below, control board 52 uses this state information to manage the distribution of electrical power to the components of patient support apparatus 20.

In order to carry out the therapy state, mattress microcontroller 138 (FIG. 3) of mattress control board 58 selectively inflates and deflates one or more bladders contained within the mattress. In some instances, the inflation and deflation of these bladders is carried out with feedback from one or more sensor 146, such as, but not limited to, one or more air pressure sensors, humidity sensors, and/or other types of sensors. Mattress microcontroller 138 also communicates with a pump or blower 148 that is used to inflate the selected mattress bladders.

Propulsion control board 60 controls an optional propulsion system that may or may not be included with patient support apparatus 20. When included, propulsion board 60 selectively drives at least one wheel of patient support apparatus 20 to thereby reduce the amount of effort required by a caregiver or other healthcare personnel when moving the patient support apparatus 20 from one location to another. Propulsion board 60 therefore is adapted to drive at least one propulsion motor 114 (FIGS. 2-3) that drives at least one wheel of the patient support apparatus 20. Propulsion board 50 includes a propulsion user interface 94 that allows a caregiver to control the propulsion system (e.g. start, stop, accelerate, decelerate, steer, etc.), and a propulsion microcontroller 150 that oversees the operation of the motor in response to the inputs received from user interface 94 and/or commands received from main microcontroller 82. Propulsion microcontroller 150 also oversees a battery monitor and charging circuit 152 that monitors the charge level of the propulsion batteries 112 and that recharges those batteries when plug 110 is coupled to a source of external electrical power and other conditions are met, as will be discussed in more detail below.

Propulsion user interface 94 may take on a variety of different forms, but in at least one embodiment, it includes one or more handles with one or more sensors that, when pushed, drive the patient support apparatus 20. One example of a propulsion system and its user interface that is suitable for incorporation into patient support apparatus 20 is disclosed in commonly assigned U.S. patent application Ser. No. 15/471,361 filed Mar. 28, 2017, by inventors Thomas Puvogel et al. and entitled PATIENT SUPPORT APPARATUSES WITH DRIVE SYSTEMS, the complete disclosure of which is incorporated herein by reference. Another example of a propulsion system and its user interface that is suitable for incorporation into patient support apparatus 20 is disclosed in commonly assigned U.S. patent application Ser. No. 15/189,149 filed Jun. 22, 2016, by inventors Jerald Trepanier et al. and entitled PERSON SUPPORT APPARATUSES WITH DRIVE CONTROLS, the complete disclosure of which is also incorporated herein by reference. Still other types of propulsion systems and/or drive controls may be incorporated into patient support apparatus 20.

Room interface board 62 (FIG. 2) of control system 50 oversees communication between patient support apparatus 20 and one or more external devices positioned within the room of the healthcare facility in which patient support apparatus 20 is currently located. Room interface board 62 includes a room interface microcontroller 98 (FIG. 3) 98, one or more transceivers 158 for communicating with a fixed locator 102 and/or a wireless wall module 96, a room interface board transceiver **144*f*, and a nurse call cable interface 160. Room interface board microcontroller 98 oversees operation of the room interface board 62, as well as the communications between patient support apparatus 20 and the in-room devices. One of the communication functions carried out by room interface board is the communication between patient support apparatus 20 and a conventional nurse call system. Conventional nurse call systems typically include one or more nurse call servers coupled to healthcare facility's local area network, one or more nurse call outlets physically coupled to the headwall of each patient room, and wiring coupling the nurse call outlets to the nurse call server and/or another call-receiving and processing structure. In the particular embodiment shown in FIGS. 2 and 3, room interface board 62 is adapted to couple to, and communicate with, a nurse call outlet vie either a nurse call cable or wirelessly. When communicating by cable, a first end of the cable is coupled to a port on patient support apparatus 20, such as nurse call cable interface 160, which is in communication with room interface board 62, and the other end of the cable is plugged into the nurse-call outlet mounted in the room's headwall. One example of the functions and structures that may be incorporated into room interface board 62** is disclosed in more detail in commonly assigned U.S. patent application Ser. No. 15/945,437 filed Apr. 4, 2018, by inventors Krishna Bhimavarapu et al. and entitled PATIENT SUPPORT APPARATUSES WITH RECONFIGURABLE COMMUNICATION, the complete disclosure of which is incorporated herein by reference.

When room interface board 62 communicates wirelessly with the nurse call system, it is configured to wirelessly communicate with a wall module 96 that is physically coupled to the nurse call outlet via a cable. Such communication takes place, in at least some embodiments, via a Bluetooth transceiver 158 (FIG. 3) incorporated into, or otherwise in communication with, room interface board 62. Suitable examples of wall modules 96 with which room interface transceiver(s) 158 can wirelessly communicate are the headwall interfaces 38 disclosed in commonly assigned U.S. patent publication 2016/0038361 published Feb. 11, 2016, by inventors Krishna Bhimavarapu et al. and entitled PATIENT SUPPORT APPARATUSES WITH WIRELESS HEADWALL COMMUNICATION, the complete disclosure of which is incorporated herein by reference. Additional functions and/or structures that may be performed by, or included with, room interface board 62 when wirelessly communicating with a wall module 96 are disclosed in the following commonly assigned patent references and may be implemented in patient support apparatus 20 herein: U.S. patent application Ser. No. 62/600,000 filed Dec. 18, 2017, by inventor Alexander J. Bodurka and entitled SMART HOSPITAL HEADWALL SYSTEM; U.S. patent application Ser. No. 62/587,867 filed Nov. 17, 2017, by inventors Alexander J. Bodurka et al. and entitled PATIENT SUPPORT APPARATUSES WITH LOCATION/MOVEMENT DETECTION; and U.S. patent application Ser. No. 62/598,787 filed Dec. 14, 2017, by inventors Alexander J. Bodurka et al. and entitled HOSPITAL HEADWALL COMMUNICATION SYSTEM, the complete disclosures of all of which are incorporated herein by reference. Still other types of wireless communication with a nurse call system may, or course, be used.

Nurse call cable interface 160 of room interface board 62 includes a plurality of switches that room interface microcontroller 98 selectively opens and closes in order to communicate via a nurse call cable with the nurse call system. The switches are in electrical communication with corresponding pins of the nurse call cable, and the opening and closing of selected ones of the switches are sensed by the nurse call system, thereby enabling the patient support apparatus 20 to communicate with the nurse call system. The room interface board 62 also includes electronic circuitry for transmitting and receiving audio signals. The audio signals include audio signals corresponding to voice communications between the patient and a remotely positioned nurse, as well as audio signals from an in-room entertainment device, such as a television. When communicating with a remotely positioned nurse, the patient communicates via a microphone and speaker combination 100 built into one or both of the siderails 34 (FIGS. 2 and 3). The signals from the microphone are forwarded to room interface board 62 for further forwarding to the nurse call system. Likewise, audio signals from the remotely positioned nurse that are received by room interface board 62 from the nurse call system are forwarded to the speaker(s) of patient support apparatus 20.

Room interface board 62 also is adapted, in some embodiments, to communicate with an adjacent fixed locator 102 (FIG. 2) in order to allow either patient support apparatus 20, or a server in communication with patient support apparatus 20, to determine its location within the healthcare facility. Fixed locators 102 can be positioned on walls, ceilings, or in other fixed locations whose absolute positions within the healthcare facility are known. Further, each fixed locator 102 includes a location identifier that uniquely identifies and distinguishes that particular locator 102 from all other such locators 102 within the healthcare facility. Room interface board 62 includes a location transceiver 158 that is specifically adapted to communicate with an adjacent fixed locator 102. In some embodiments, the location transceiver 158 is an infrared transceiver. The fixed locator 102 transmits a unique identifier to the location transceiver 158, which then forwards it to room interface microcontroller 98. Room interface microcontroller 98 appends the unique ID, or otherwise incorporates it into, the wireless messages it transmits to a local area network, such as to a patient support apparatus server on the healthcare facility's local area network. Room interface microcontroller 98 may also use the unique ID as an address when it sends wireless messages via it wireless transceiver (e.g. Bluetooth) to the adjacent wall module 96. In this manner, any other wall modules 96 that may be within Bluetooth range of the room interface board's transceiver do not respond to these messages because they are not addressed to them.

The location transceiver 158 coupled to room interface board 62 is able to communicate with a nearby fixed locator 102 only when the patient support apparatus 20 is positioned within a relatively close proximity thereto. Such proximity may be on the order of five to ten feet, or it may be other distances. In some embodiments, the location transceiver communicates with fixed locators 102 at least partially via infrared signals, although it will be understood by those skilled in the art that other types of signals may be used for communication between locators 102 and room interface board 62. Fixed locator 102 sends a location identifier that uniquely identifies the fixed locator 102 to the location transceiver when the patient support apparatus 20 is positioned sufficiently adjacent the fixed locator 102.

In general, because the locations of locators 102 are known, and because the patient support apparatuses can only communicate with a given locator 102 (via the location transceiver of room interface board 62) when they are within a close proximity to the given locator 102, the very establishment of such communication indicates that the patient support apparatus 20 is in close proximity to a given locator 102 whose location is known. This allows the location of a patient support apparatus 20 to be determined. Further details of the operation of locators 102 and the location transceivers, as well as the manner in which they can be used to determine location, are found in commonly assigned, U.S. patent application Ser. No. 12/573,545 filed Oct. 5, 2009 by applicants David Becker et al. and entitled LOCATION DETECTION SYSTEM FOR A PATIENT HANDLING DEVICE and U.S. patent application Ser. No. 15/909,131 filed Mar. 1, 2018 by applicants Michael Joseph Hayes et al. and entitled PATIENT SUPPORT APARATUS COMMUNICATION SYSTEMS, the complete disclosures of which are also incorporated by reference herein. Fixed locators 102 may also take on any of the forms, and perform any of the functions, disclosed in commonly assigned U.S. patents application Ser. Nos. 14/819,844 filed Aug. 6, 2015, by inventors Krishna Bhimavarapu et al. and entitled PATIENT SUPPORT APPARATUSES WITH WIRELESS HEADWALL COMMUNICATION; 16/217,203 filed Dec. 12, 2018, by inventor Alex Bodurka, and entitled SMART HOSPITAL HEADWALL SYSTEM; 16/193,150 filed Nov. 16, 2018, by inventors Alexander Bodurka et al. and entitled PATIENT SUPPORT APPARATUSES WITH LOCATION/MOVEMENT DETECTION; and 16/215,911 filed Dec. 11, 2018, by inventors Alex Bodurka et al. and entitled HOSPITAL HEADWALL COMMUNICATION SYSTEM, the complete disclosures of all of which are incorporated herein.

Inner and outer siderail boards 64 and 66 (FIGS. 2 and 3) are adapted to control the corresponding inner and outer control panels **48*b* and 48*c*. As was noted previously, each of the control panels 48*a-c* includes a plurality of user controls 104 for controlling various functions of the patient support apparatus 20. One or more of the controls panels 48*a-c* may also or alternatively include a display 106. When included, display 106 is a touch screen display in at least some embodiments, although it will be understood that a non-touch screen display 106 may alternatively be used. It will also be understood that any of the control panels 48*a-c* may be implemented without any display at all. Controls 104 can be touch sensitive controls that may be physically implemented in a variety of different manners. In some embodiments, controls 104 are implemented as capacitive sensors positioned adjacent display 106 that capacitively detect when a user presses them. In other embodiments, controls 104 are implemented as buttons, switches, or other types of force or touch-sensitive devices. In still other embodiments, one or more of controls 104 may be incorporated into touchscreen display 106**. Still other variations are possible.

The controls 104 of control panels **48*a-c* include controls for raising/lowering the litter frame 28, changing the position of a section 40-46 of the support deck 30, activating/deactivating a brake, controlling a scale/exit detection system (e.g. taking a weight reading, arming an exit detection system, etc.), locking out one or more functions, setting an alert, inputting patient information and/or therapy data (e.g. a prescribed turning frequency, etc.), and/or other controls. At least one of the inner control panels 48*b* also include a nurse call button, as well as the speaker and microphone 100**, which collectively enable the patient to call and talk to a remotely positioned nurse, such as a nurse located at a corresponding nurses' station within the healthcare facility.

Siderail control boards 64 and 66 each include siderail microcontrollers 162 that process the controls 104 activated by a user and send appropriate messages to main control board 52 in response to the activation of the controls 104. For example, if a user presses a control 104 dedicated to raising head section 40, siderail microcontroller 162 of control board 64 (if inner control panel **48*b* was activated) or siderail microcontroller 162 of control board 66 (if outer control panel 48*c* was activated) sends a message to main control board 52 instructing it to raise the head section 40. Main control board 52 forwards the message to motion control board 54 which, in turn, sends the appropriate control signals to the motorized actuator 84*a*, thereby causing motorized actuator 84*a* to raise head section 40. Alternatively, the microcontroller 162** of siderail control boards 64 or 66 may send a motion control message directly to motion control board 54 in response to a user activating the control 104 for raising the head section 40, thereby avoiding the need for main control board 52 to act as an intermediary between boards 64 (or 66) and motion control board 54. Siderail control boards 64 and 66 may also control the illumination of controls 104, any audio and/or visual alerting structures built into siderails 34, a USB port 108 (FIG. 2), and the microphone and speakers 100. USB port 108, if included, allows a patient to charge any USB compatible personal electronic devices he or she may possess while positioned on support deck 30. One example of the functional and/or structural design of USB port 108 that may be incorporated into patient support apparatus 20 is disclosed in commonly assigned U.S. patent application Ser. No. 16/035,156 filed Jul. 13, 2018, by inventors Krishna Bhimavarapu et al. and entitled PATIENT SUPPORT APPARATUSES WITH PERSONAL ELECTRONIC DEVICE CHARGING, the complete disclosure of which is incorporated herein by reference.

As noted previously, main control board 52 is in communication with night light 68, a brake switch 70, and an electric brake 72. Night light 68, when activated, provides illumination to an adjacent area of the floor, thereby helping a patient to navigate during low light conditions. Brake switch 70 is a sensor that sends a signal to main control board 52 indicating whether the brake of patient support apparatus 20 is currently activated or not. The brake resists movement of patient support apparatus 20 when activated. In some embodiments, the activation of the brake applies a braking force to all of wheels 24, while in other embodiments, the activation of the brake applies a braking force to a subset of the wheels 24 and/or to one or more other wheels on patient support apparatus 20. Electric brake 72 is an electrical actuator that allows a user to electrically activate the brake through a corresponding control 104 positioned on one or more of control panels 48*a-c*. Electric brake 72 is often accompanied by a manual actuator such as, but not limited to, one or more pedals, thereby giving the user the option of manually and mechanically actuating the brake or electrically actuating the brake. In some embodiments, electric brake 72 is constructed in accordance with the electric brake disclosed in commonly assigned U.S. Pat. No. 8,701,229 issued Apr. 22, 2014, to inventors Guy Lemire et al. and entitled HOSPITAL BED, the complete disclosure of which is incorporated herein by reference. Still other types of electric brakes may, of course, be used.

Main control board 52 is adapted to communicate with a patient pendant 74 that may be coupled to patient support apparatus 20. The patient pendant 74, when included, plugs into a port in communication with main control board 52 and includes one or more controls 104 for controlling various aspects of patient support apparatus 20. The patient pendant 74 may also include a speaker and microphone 100, thereby enabling the pendant 74 to be used as a communication device for communicating with a remotely positioned nurse (via the nurse call system and room interface board 62, as described previously).

Load cells 80 feed into main control board 52. Load cells 80 are configured to support litter frame 28. More specifically, load cells 80 are configured such that they provide complete mechanical support for litter frame 28 and all of the components that are supported on litter frame 28 (e.g. support deck 30, footboard 32, the headboard, siderails 34, etc.). Because of this construction, load cells 80 detect the weight of not only those components of patient support apparatus 20 that are supported by litter frame 28 (including litter frame 28 itself), but also any objects or persons who are wholly or partially being supported by support deck 30. Load cells 80 are adapted to detect downward forces exerted by an occupant of support deck 30. Thus, when an occupant is positioned on support deck 30 and substantially still (i.e. not moving in a manner involving accelerations that cause forces to be exerted against support deck 30), load cells 80 detect the weight of the occupant (as well as the weight of any components of patient support apparatus 20 that are supported—directly or indirectly—by load cells 80).

The outputs of load cells 80 are processed by main control board 52. In some embodiments, main microcontroller 82 processes the outputs, while in other embodiments, a separate microcontroller on main control board 52 processes the outputs. The outputs of load cells 80 are processed in order to implement a scale function and/or an exit detection function. When implementing the scale function, main control board 52 sums the outputs of the load cells 80 to determine a weight of the patient. When implementing the exit detection function, main control board 52 processes the outputs of the load cells 80 to detect when an occupant has exited the patient support apparatus 20, or when an occupant may be about to exit the patient support apparatus 20. One exemplary manner of processing the outputs of load cells 80 to implement an exit detection function and/or a scale function is described in U.S. Patent Application Pub. No. 2017/0003159, filed on Jun. 17, 2016, entitled PERSON SUPPORT APPARATUS WITH LOAD CELLS, which is hereby incorporated by reference herein in its entirety. Another exemplary exit detection function that may be incorporated into patient support apparatus 20 is described in U.S. Pat. No. 5,276,432, filed on Jan. 15, 1992, entitled PATIENT EXIT DETECTION MECHANISM FOR HOSPITAL BED, which is hereby incorporated by reference herein in its entirety. Other types of scale and/or exit detection functionality and/or algorithms may be used.

In some embodiments, load cells 80 may be replaced with linear variable displacement transducers and/or any one or more capacitive, inductive, and/or resistive transducers that are configured to produce a changing output in response to changes in the force exerted against them. Still other types of forces sensors may be used with patient support apparatus 20 in lieu of, or in addition to, load cells 80.

Power supply 76 is electrically coupled to an outlet plug 110 (FIG. 2) that is adapted to be inserted into a conventional wall power outlet. That is, power supply 76 is adapted to receive electrical power from a mains source of electricity and to deliver that power to the main control board. As shown in FIG. 2, the power received by plug 110 passes through an inlet filter 154 (such as an IEC 320 style inlet filter) and a circuit breaker 156 before being delivered to power supply 76. Inlet filter 154 may include a fuse and/or other circuitry for limiting the amount of electrical power delivered to control system 50. Circuit breakers 156 protect power supply 76 and the rest of control system 50 from excessive voltage and/or current by interrupting the current flow to power supply 76 when such a condition is detected.

Power supply 76 performs a number of functions including, but not limited to, rectifying the incoming main power from AC to DC, down converting the incoming voltage to a suitable voltage (e.g. 36 volts), providing overcurrent and/or overvoltage protection, reducing and/or eliminating power noise, and the like. Power supply 76 may be a commercially available off-the-shelf component, and may include a maximum power rating, such as, but not limited, to 600 Watts. The output of power supply 76 is fed to main control board 52 which, as will be discussed more below, supplies electrical power at different voltages to the various components of control system 50.

Before turning to the power circuitry of main control board 52, it can be seen from FIG. 2 that control system 50 is also capable of operating on battery power. More specifically, control system 50 includes a pair of main batteries 78 and a pair of propulsion batteries 112. Although different voltages and/or capacities may be used, main batteries 78 are illustrated in FIG. 2 to be 12 volt batteries (coupled together in series to generate 24 volts) that each have a capacity of 1.2 ampere-hours, and propulsion batteries 112 are also each 12 volt batteries (coupled together in series to generate 24 volts) having individual capacities of 17.2 ampere-hours. Main batteries 78 are used by control system 50 when outlet plug 110 is not coupled to an external source of electrical power (or when that external source of electrical power fails). As will be explained further below, main control board 52 utilizes main batteries 78 to supply power to all of the electrical components of control system 50 with the exception of one or more propulsion motors 114 and the propulsion user interface 94. Propulsion motors 114 drive one or more of the wheels of patient support apparatus 20 in order to reduce the effort required by a caregiver to move patient support apparatus 20 to different locations. Propulsion motors 114 operate in response to commands received from propulsion control board 60 which, in turn, sends those commands in response to corresponding user inputs from propulsion user interface 94.

Main control board 52 also includes a plurality of electrically programmable fuses 118 (or "electronic fuses" or "e-fuses," for short). A complete set of these e-fuses 118 is shown in FIG. 2, while only a subset of these e-fuses 118 is shown in FIG. 3. E-fuses 118 may be commercially available, off-the-shelf components, or they may be custom designed electronic fuses. In at least one embodiment, e-fuses 118 are selected from the Texas Instruments TPS 2660× family of industrial e-fuses. Other types of e- fuses, however, may be utilized. E-fuses 118 may allow several amperes or more of electrical current before shutting off, protect the loads from positive and negative supply voltages up to plus or minus sixty volts, include adjustable overcurrent, output slew rate, overvoltage, and undervoltage thresholds, and include a shutdown pin for external control by main microcontroller 82 that allows main microcontroller 82 to enable and disable the e-fuse. Additionally, the e-fuses 118 enable precise current and voltage monitoring to thereby provide feedback to main microcontroller 82 of the power being delivered to each of the control boards and other components of patient support apparatus 20 that receive electrical power from main control board 52. In many embodiments, e-fuses 118 are fast blow fuses that cut off power in less than a second (when the current limit is exceeded) and that are configured automatically retry delivering power to the downstream control board after tripping. In alternative embodiments, one or more of the fuses may be set to not implement the automatic retry feature after tripping.

Figure 3:
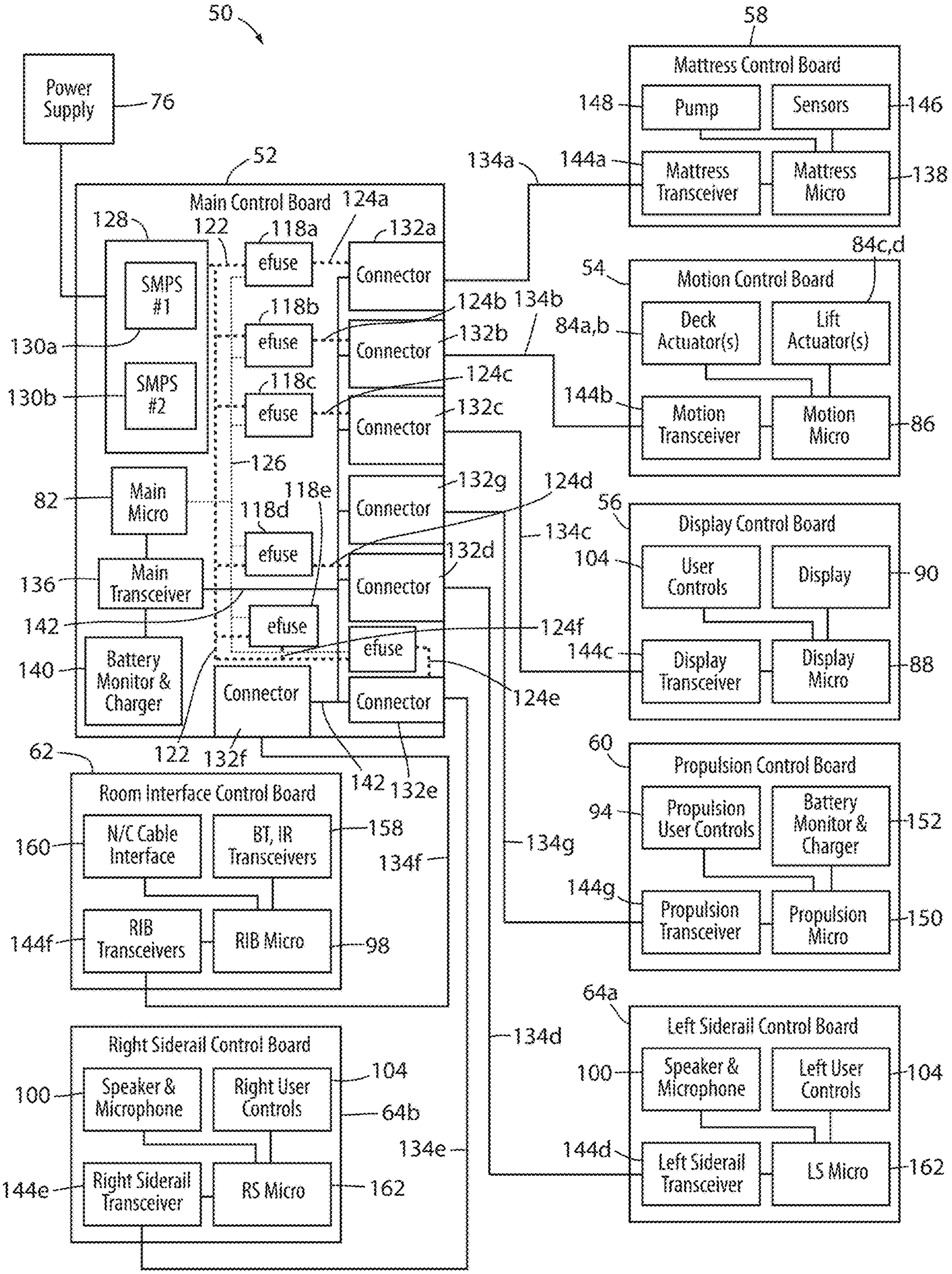
FIG. 3 is a diagram showing more details of several electrical boards and connectors of the control system of FIG. 2.

More particularly, and as shown in FIG. 3, main control board 52 includes a mattress control board e-fuse 118*a*, a motion control board e-fuse 118*b*, a display control board e-fuse 118*c*, a left siderail control board e-fuse 118*d*, a right siderail control board e-fuse 118*e*, and a room interface board e-fuse 118*f*. As shown in FIG. 2, main control board 52 may also include a patient pendant e-fuse 118*g* and/or a patient pendant e-fuse 118*h*. Each of these e-fuses includes a power input, a power output, and at least one control interface. The power inputs are coupled to a power input line 122 and the power outputs are coupled to a power output line 124. The control interface is coupled to a control line 126. The purpose and function of these lines 122, 124, and 126 are described in greater detail below.

As shown in FIG. 3, main control board 52 includes a power circuit 128 comprising a pair of switched mode power supplies (SMPS) 130*a* and 130*b*. In one embodiment, SMPS's 130*a* and 130*b* are DC-to-DC power converters, and first SMPS 130*a* converts a 36 volt input (from power supply 76) or a 24 volt input (from main batteries 78) into a twelve volt output. The twelve volt output is fed to many of the e-fuses 118 via power output lines 124. The twelve volt output is also fed to second SMPS 130*b*, which takes the twelve volt input and outputs both a 5 volt output and a 3.3 volt output. The 5 volt and 3.3 volt outputs are fed to various components on main control board 52, as well as to some of the other electrical components of control system 50. In at least one embodiment, power circuit 128 feeds twelve volts to each of the following e-fuses via power input line 122: mattress control board e-fuse 118*a*, motion control board e-fuse 118*b*, display control board e-fuse 118*c*, left siderail control board e-fuse 118*d*, right siderail control board e-fuse 118*e*, room interface board e-fuse 118*f*, and pendant e-fuse 118*g*. Power circuit 128 does not feed twelve volts to the electric brake 72 or to propulsion control board 60. Propulsion control board 60 receives its power from propulsion batteries 112. Electric brake 72, in at least one embodiment, receives a 24 volt power supply from power circuit 128. Power circuit 128 also feeds 5 volts and/or 3 volts to selected ones of the control boards and/or other components of control system 50.

The outputs of each of the e-fuses 118 are fed to a corresponding connector. More particularly, the output of e-fuse 118*a* is fed to connector 132*a*; the output of e-fuse 118*b* is fed to connector 132*b*; the output of e-fuse 118*c* is fed to connector 132*c*; the output of e-fuse 118*d* is fed to connector 132*d*; the output of e-fuse 118*e* is fed to connector 132*e*; and the output of e-fuse 118*f* is fed to connector 132*f*. Each connector 132 is adapted to receive a corresponding cable 134 that electrically couples the connector 132 to another component of control system 50. For example, connector 132*a* is physically and electrically configured to receive a first end of a cable 134 that has its second end electrically and physically coupled to mattress control board 58, thereby enabling main control board 52 to communicate with mattress control board 58, and vice versa. Connector 132*b* does the same for a cable 134*b* that extends between main control board 52 and motion control board 54. Similarly, connectors 132*c, d, e*, and *f* couple to cables 134*c, d, e*, and *f*, and enable main control board 52 to communicate with each of display control board 56, left siderail control board 64*a*, right siderail control board 64*b*, and room interface board 62, respectively. Similarly, a connector 132*g* is adapted to physically and electrically receive a first end of a cable 134*g* that has its second end physically and electrically coupled to propulsion control board 60, thereby enabling main control board 52 to communicate with propulsion control board 60, and vice versa.

In addition to delivering electrical power from main control board 52 to the other boards, each cable 134 also transfers data between the respective control boards. That is, each connector 132 is a multi-pin connector wherein at least two of the pins are used for data communication (e.g. CAN High and CAN Low), at least one pin is used for power high, and at least one pin is used for power low (e.g. ground). Additional pins may be present for sending addition data and/or other signals that are not communicated over the embedded network connection (e.g. the CAN network). As noted, for many components, the data connections comprise a CAN bus, although it will be understood that other communication protocols can be used. For motion control board 54, the data connection is, in at least some embodiments, a LIN bus. For those components that do not utilize microcontroller (e.g. night light 68, brake switch 70, electric brake 72, load cells 80), the data connection may be a Serial Peripheral Interface (SPI), I2C, or other type of connection. Still other types of communication protocols may be used.

In at least one embodiment, each connector 132 is uniquely shaped from the other connectors 132 such that during manufacturing of the patient support apparatus 20, it is not possible to improperly couple a cable from a specific connector on main control board 52 to an incorrect board. This is because each of the connectors on boards 54-64 are also likewise unique from each other, but match corresponding connectors on main control board 52. Thus, in at least one embodiment, mattress control board 58 includes a connector (not shown) that is the same as connector 132*a* of main control board 52, and those two connectors are different from any of the other connectors used to couple main control board 52 to any of the other components of control system 50. During the manufacturing process of patient support apparatus 20, it is therefore impossible to connect a cable from connector 132*a* of main control board 52 to any other component other than mattress control board 58. This is because cable 134*a* will not match any of the other connectors other than the connector 132*a* of main control board 52 and the similarly shaped and sized connector on mattress control board 58. As a result, if the individual manufacturing patient support apparatus plugs a first end of cable 134*a* into connector 132*a*, the other end of the cable will not match any connectors on any of the boards except for mattress control board 58. Similarly, the only cable 134 that will match connector 132*b* will be cable 134*b*, and that cable will have a connector on its other end that will only match the connector of motion control board 54, not the connectors of any of the other control boards. In this manner, the installation of the cabling during the manufacturing of patient support apparatus 20 is accomplished in a poka-yoke manner; that is, the cabling is designed to be mistake-proof such that it is impossible, for example, to couple display control board 56 to a connector of main control board 52 other than the proper connector; namely, connector 132*c*.

Although the foregoing description of the connectors of patient support apparatus 20 been provided with respect to cables 134 that have the same style of connector at each end, it will be understood that this is not required to manufacture patient support apparatus 20 in a mistake-proof manner. As an alternative, one or more of cables 134 may include a first end connector that is different from the second end connector. In such an embodiment, patient support apparatus 20 can still be cabled during the manufacturing process in a mistake proof manner so long as each end of the cable is only a match for a single other connector on all of the boards 52-62 (and other components) of patient support apparatus 20. By designing control system 50 such that each connector of each of the cables is only able to correctly mate with a single other connector on one of the boards, the cables can only be connected to the correct boards.

Still further, it will be understood that patient support apparatus 20 can be designed with a mixture of cables 134, some of which have the same connectors on each of their ends, and others of which have different types of connectors on each of their ends. In such a design, the cabling can be configured in a mistake-proof manner by ensuring that those cables with identical connectors only match the correct two connectors specific for that cable, and those cables with different connectors have connectors that only match a single connector in control system 50. Regardless of the specific implementation, the use of mistake-proof cabling ensures that the manufacturing of patient support apparatus 20 is accomplished in a manner that reduces the costs and wasted time associated with improperly installed cabling.

It will be understood by those skilled in the art that FIG. 3 shows a simplified connection between power circuit 128 and each of the e-fuses 118 and their associated connectors 132. That is, FIG. 3 shows a single power line 122 connecting power circuit 128 to each of the e-fuses 118. In actuality, two or more separate power lines 122 may extend from power circuit 128 to two or more of the e-fuses 118, rather than a single line 122 coupled between power circuit 128 and all of the e-fuses 118. Further, FIG. 3 shows a simplified connection between main microcontroller 82 and each of the e-fuses 118*c*. That is, FIG. 3 depicts a single control line 126 between main microcontroller 82 and all of the e-fuses 118. In some embodiments, main microcontroller 82 has separate control lines 126 coupling it to each of the e-fuses 118. As will be discussed in greater detail below, microcontroller 82 uses the control lines 126 to control the e-fuses, as well as to receive feedback from the e-fuses 118. In some embodiments, control line 126 are coupled directly to microcontroller 82, while in other embodiments (not shown) control lines 126 are coupled to a main microcontroller transceiver 136 that acts as an intermediary between the microcontroller and the e-fuses 118.

It will also be understood that FIG. 3 is simplified in the sense that it only shows a portion of the components of control system 50 that are illustrated in FIG. 2. This is merely done for clarity reasons. Control system 50 of FIG. 3 includes all of the components of control system 50 of FIG. 2, but only a subset of those are illustrated in FIG. 3 to provide more details regarding several components, functions, and principles of operation of control system 50.

Main microcontroller 82, in at least one embodiment, is a microcontroller from the Kinetis MK66F family of microcontrollers manufactured by NXP semiconductors of Eindhoven, the Netherlands, such as, but not limited to, the Kinetis MK66FN2MOVLQ18 microcontroller. Other microcontrollers can, of course be used. The microcontrollers of control boards 52-66 may also be microcontrollers from the Kinetis MK66F family, or they may be from other families of Kinetis microcontrollers, or they may be from still other families, brands, and/or manufacturers. In general, each of the control boards 52-66 include, in addition to the microcontrollers discussed herein, additional circuitry and programming for carrying out the functions described herein, as would be known to one of ordinary skill in the art. Such additional circuitry may include, but is not limited to, field programmable gate arrays, volatile or nonvolatile memory, discrete circuitry, and/or other hardware, software, or firmware that is capable of carrying out the functions described herein. The components of each board can be physically configured in any suitable manner, such as by mounting them all to a single circuit board, or they can be distributed across multiple circuit boards. The instructions followed by each of the microcontrollers in carrying out the functions described herein, as well as the data necessary for carrying out these functions, are stored in memories (not labeled) mounted to each of the control boards, or otherwise accessible to each microcontroller.

In addition to the aforementioned components, main control board 52 also includes main transceiver 136 and a battery monitor and charging circuit 140. Battery monitor and charging circuit 140, which will be described in more detail below, monitors the charge state of main batteries 78 and reports that information to main microcontroller 82. Battery monitoring and charging circuit 140 also oversees the recharging of main batteries 78 when the power plug 110 of patient support apparatus 20 is coupled to an external source of AC power and other conditions are met, as will also be discussed in more detail below.

Main transceiver 136, in at least one embodiment, is a CAN transceiver adapted to allow main microcontroller 82 to communicate over a CAN bus. In some embodiments, CAN transceiver 136 may be built into main microcontroller 82. In other embodiments, CAN transceiver 136 may be a component physically separate from main microcontroller 82. Still further, in other embodiments, main transceiver 136 may be a different type of transceiver, such as, but not limited to, a LONWorks transceiver, an Ethernet transceiver, a LIN transceiver, or still a different type of transceiver. Whatever type of transceiver it is, main transceiver 136 formats the messages and/or commands sent from main microcontroller 82 into the packet format, frame format, or other format of the communication protocol that is used to communicate with the other control boards of control system 50. Similarly, main transceiver 136 also receives packets, frames, or other data structures back from the other control boards and extracts the contents of those packets, frames, or other data for forwarding to main microcontroller 82. Transceiver 136 also handles the arbitration and other tasks associated with the first and second layers of the OSI communication model.

Although FIG. 3 illustrates main transceiver 136 as being coupled to all of the connectors 132 via only a single bus line 142, it will be understood that this may be varied. That is, in some embodiments, main microcontroller 82 may divide its internal communications with the other boards of control system 50 into separate embedded networks that are isolated from each other. For example, boards 54 and 56 might communicate with main microcontroller 82 via a first CAN bus, and the remaining boards might communicating with main microcontroller 82 via a second CAN bus. In such a case, main microcontroller 82 may include two main transceivers 136, one of which is coupled by a first bus line 142 to connectors 132*b* and 132*c*, and the other of which is coupled by a second bus line to the other connectors 132. Still other manners of segmenting the internal network communications may also be implemented.

Each of the control boards includes a transceiver 144 that is physically coupled to corresponding pins of the cable 134 extending to it from main control board 52. Thus, mattress control board 58 includes a mattress transceiver 144*a* in communication with cable 134*a*; motion control board 54 includes a motion transceiver 144*b* in communication with cable 134*b*; display control board 56 includes a display transceiver 144*c* in communication with cable 134*c*; left siderail control board 64*a* includes a left siderail transceiver 144*d* in communication with cable 134*d*; right siderail control board 64*b* includes a right siderail transceiver 144*e* in communication with cable 134*e*; room interface board 62 includes a room interface transceiver 144*f* in communication with cable 134*f*; and propulsion control board 60 includes a propulsion transceiver 144*g* in communication with cable 134*g*. Transceivers 144 perform the same functions described above with respect to main transceiver 136. That is, they packetize and depacketize (or otherwise process) messages for transportation over the one or more buses that communicatively couple main transceiver 136 and main microcontroller 82 to each of the other boards.

In some embodiments, one or more of transceivers 144 are commercially available off-the-shelf transceivers that are configured to be able to power down the entire node (e.g. the associated microcontroller and other components of the associated board) while supporting local, remote, and host wake-up. Thus, for example, mattress transceiver 144*a* may be a transceiver that, upon receipt of a specific message, wakes up mattress microcontroller 138 after it has gone to sleep. When in the sleep mode, the microcontroller consumes substantially no power (or zero power). Main microcontroller 82 is adapted to send a sleep command to the mattress transceiver 144*a* (or any of the other transceivers 144) that instructs the corresponding microcontroller to go to sleep. This reduces the power consumption associated with that particular board. When a microcontroller goes to sleep, it also puts to sleep all of the other electrical components of the board (with the exception of the transceiver 144 itself, which uses exceptionally little power). Main microcontroller 82 can therefore put a board to sleep by sending a sleep command to the board's corresponding microcontroller, as well as wake up that microcontroller by sending a wake command to that microcontroller's corresponding transceiver 144. The waking up of the microcontroller in response to a transceiver-received wake command occurs, in at least some embodiments, in less than one second, thereby allowing the control board to be put to sleep and awakened with little delay to the user, and in some cases, without the user being able to notice that a particular board has been put to sleep. The times at which main microcontroller 82 may put to sleep one or more of the boards on patient support apparatus 20 are discussed in more detail below.

Main microcontroller 82 is configured to control the supply of electrical power to each of the boards 54-66, as well as to the other components of control system 50. Main microcontroller 82 accomplishes this power distribution control in several different manners. One manner is through commands sent to e-fuses 118. Another manner is through commands sent to one or more of the microcontrollers of boards 54-66, such as, but not limited to, commands to limit the power consumption of the respective board. The power-limiting commands from main microcontroller 82 may explicitly tell the recipient microcontroller how to limit the power consumption, or they may tell the recipient microcontroller a power value that is not to be exceeded and leave it up to the recipient microcontroller to follow its own programming to ensure the power value is not exceeded (e.g. using slower speed commands when less power consumption is desired and using faster speed commands when more power consumption is acceptable). Still another manner by which main microcontroller 82 may control the supply of electrical power to each of the boards 540-56 is through the transmission of wake and sleep commands to the transceivers 144, causing their corresponding microcontrollers to shut down and wake up, and thereby affecting the total amount of electrical power consumed by the patient support apparatus 20 at any given time. Still another manner is through the controlling of when certain actions take place, such as, but not limited to, the charging of main and/or propulsion batteries 78 and/or 112, the provisioning of mattress therapies, the movement of one or more actuators 84, and still other actions. These various power control techniques are discussed in greater detail below.

Figure 4:
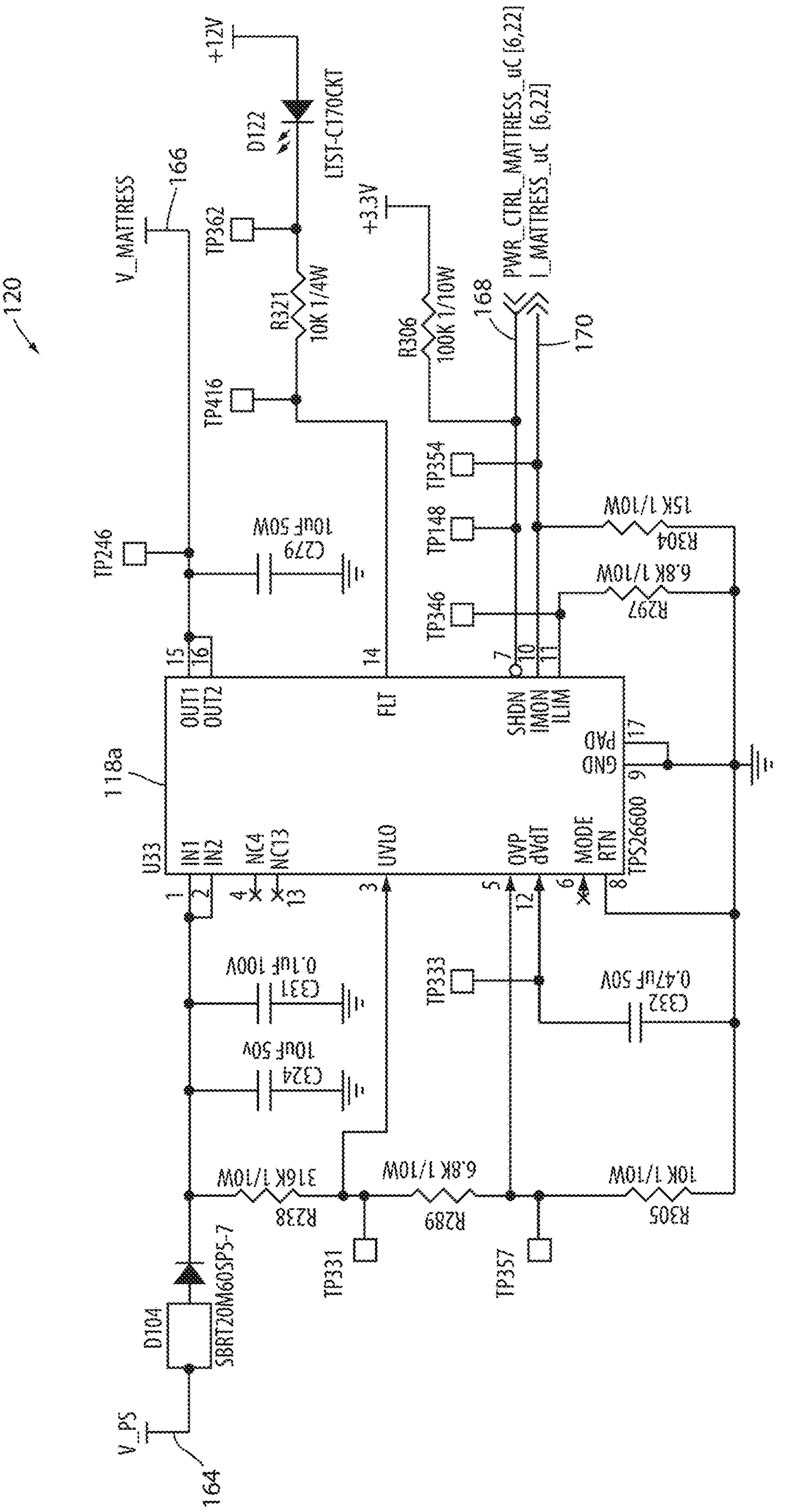
FIG. 4 is a circuit diagram of one embodiment of an electronic fuse circuit used in the control system of FIG. 2.

FIG. 4 illustrates one example of an e-fuse circuit 120 according to the present disclosure. More particularly, FIG.

4 illustrates one example of an e-fuse circuit that includes mattress e-fuse 118*a*. E-fuse circuit 120 includes a power input 164 that couples to power input line 122 (FIG. 3). The power input 164 therefore delivers the electrical power to e-fuse 118*a* that e-fuse 118*a* oversees and delivers to the control boards 54-66. E-fuse circuit 120 also includes a power output 166, a control input 168, and a feedback output 170. Power output 166 couples to power output line 124*a*, which is coupled to connector 132*a* and supplies electrical power to mattress control board 58. Control input 168 is coupled to main microcontroller 82 and enables main microcontroller 82 to change one or more of the threshold values of e-fuse 118*a* (e.g. maximum current, maximum voltage, temperature protection, etc.). Feedback output 170 is also coupled to main microcontroller 82 and provides feedback to main microcontroller 82 of various measurements regarding the current state of electrical power delivered by the e-fuse to power output 166 (and the downstream load). This information includes readings of the amount of electrical current delivered to output 166, the voltage at output 166, and other measurements. Although control input 168 and control output 170 are separate inputs into e-fuse 118*a* (as shown in FIG. 4), they are represented schematically in FIG. 3 as being coupled to a single control line 126 into main microcontroller 82. It will be understood that has been done merely for purposes of clarity, and that separate control lines are coupled to each e-fuse 118.

As was noted previously, each e-fuse 118 provides overvoltage protection to the downstream load (e.g. the associated control board 54, 56, 58, etc.); provides over-temperature protection to the downstream load; monitors voltage and current; reports faults; and provides inrush current protection, short circuit protection, reverse polarity protection, reverse current blocking, and robust surge protection. Further, although it will be understood by those skilled in the art that other e-fuses may be used, the use of e-fuses manufactured by Texas Instruments and from the TPS 2660× family of industrial e-fuses offers the advantage of being a United Laboratories (UL) recognized solid state overcurrent protector that satisfies the UL-2367 and UL-60950 safety standards.

Main microcontroller 82 is programmed, in some embodiments, to send commands to control input 168 of one or more of the e-fuses 118 based upon the currently detected power demands of control system 50. By changing the amount of electrical power delivered to one or more control boards 54-66 through the selective commands to one or more corresponding e-fuses 118, main microcontroller 82 is able to limit the amount of electrical power consumed by control system 50 at any given point in time. Main microcontroller 82 is therefore programmed to prioritize and control the distribution of electrical power when the demand for electrical power exceeds the capabilities or ratings of power supply 76. This prioritization and rationing of electrical power is discussed in more detail below with respect to FIG. 5. In at least one alternative embodiment, main microcontroller 82 does not dynamically adjust the current limits of the e- fuses 118 during the operation of the patient support apparatus 20 in order to control the power consumption, but instead uses one or more of the other techniques discussed herein to control the power consumption (e.g. sending power-limiting commands, wake/sleep commands, and/or delaying certain actions at certain times, etc.) while leaving the overcurrent limits of the e-fuses as originally set.

Figure 5:
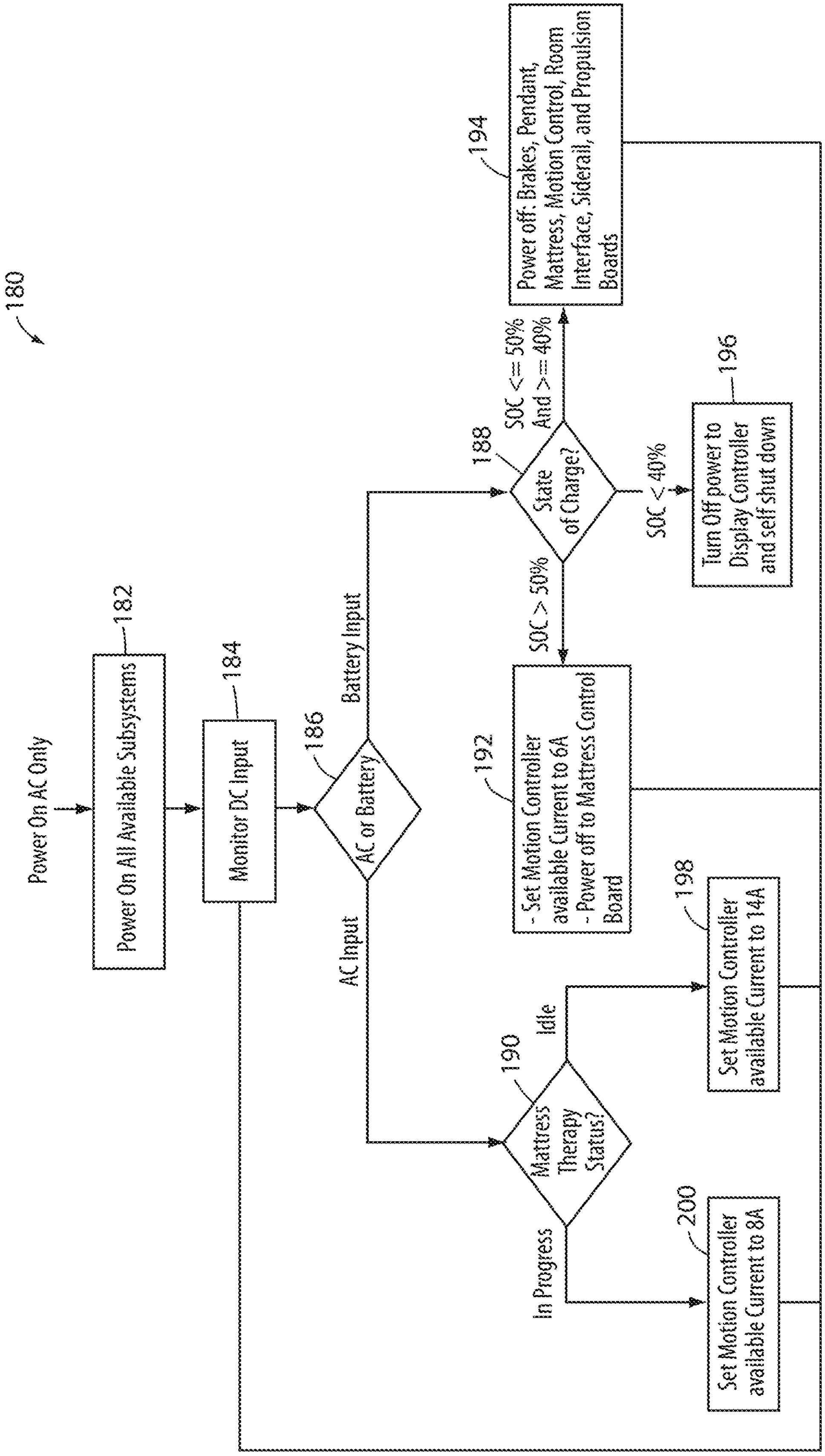
FIG. 5 is a flowchart of a power distribution algorithm used by the main microcontroller of the control system to manage and distribute electrical power to components of the patient support apparatus.

FIG. 5 illustrates a power distribution algorithm 180 that is followed by main microcontroller 82. Power distribution algorithm 180 starts at an initial step 182 where main microcontroller 82 supplies electrical power to all of the components of control system 50 when the patient support apparatus 20 is receiving electrical power from an AC outlet (e.g. via electrical plug 110). From step 182, main microcontroller 82 proceeds to step 184 where it monitors the power inputs into main control board 52. If AC power is being input, the power delivered to main control board 52 from power supply 76 will be at approximately 36 volts. If the AC power is not available, the power delivered to main control board 52 will be from main batteries 78 and will be approximately 24 volts. Main microcontroller 82 monitors the power input into main control board 52 and determines at step 186 whether the control system is being powered by an external AC source or by the batteries. As noted, main microcontroller 82 distinguishes between these two power supplies by the input voltage, in at least one embodiment.

If main microcontroller 82 determines at step 186 (FIG. 5) that the main control board 52 is receiving power from the main batteries 78, it proceeds to step 188; and if main microcontroller 82 determines at step 186 that the main control board 52 is receiving power from an external AC input, it proceeds to step 190. Turning first to step 188, main microcontroller 82 determines a charge state of the battery at step 188. This is done by reading the output(s) from battery monitor and charging circuit 140, which, as noted, may be a conventional circuit for monitoring various characteristics of main batteries 78 (including, but not limited to, the current charge state of the batteries 78).

If main microcontroller 82 determines at step 188 that the main batteries 78 are above a first threshold, it proceeds to step 192 where it limits the amount of current available to various components of control system 50. More specifically, at step 192, main microcontroller 82 terminates electrical power to mattress control board 58 and limits the amount of electrical current that main control board 52 will supply to motion control board 54 to no more than a first limit. In this particular embodiment, the first limit is set to six amperes, although it will be understood that this limit may be modified in different embodiments. By terminating electrical power to mattress control board 58 when operating on battery power, main microcontroller 82 limits the provisioning of mattress therapies to a patient to only those times when the patient support apparatus 20 is plugged into an electrical outlet. This has little practical effect on the usability of patient support apparatus 20 since battery power is typically only used when the patient support apparatus 20 is being transported between locations, and during such transport times, therapy is typically not being provided.

Main microcontroller 82 may be configured to limit the amount of electrical current drawn by motion control board 54 to the first limit (e.g. six amperes) in a variety of different manners. In a first manner, main microcontroller 82 sends a command to motion microcontroller 86 of motion control board 54 instructing it not to exceed the first current limit. In response to this command, motion microcontroller 86 adjusts the commands and/or the timing of the commands it sends to drive actuators 84. For example, as noted previously, in one embodiment, motion microcontroller 86 may reduce the duty cycle of the PWM drive signals sent to the motorized actuators 84 such that the current drawn by the motors does not exceed the first limit. This method may reduce the speed at which the actuators 84 move.

Alternatively, or additionally, motion microcontroller 86 may stagger the movement of multiple actuators so that the number of actuators simultaneously being driven is reduced from the number that would otherwise be simultaneously driven were patient support apparatus 20 operating on AC power. Thus, for example, if the user activates a control 104 to move the litter frame 28 to a Trendelenburg position, and this would normally (e.g. when operating on AC power) cause motion controller 86 to simultaneously lower head end lift actuator 84*d* while simultaneously raising foot end lift actuator 84*c*, motion microcontroller 86 may stagger the movement of lifts 84*c* and 84*d* such that one of them moves first and then the other one moves afterward, thereby drawing less current than would otherwise be drawn if they were to both operate simultaneously.

A second manner by which main microcontroller 82 may limit the amount of current consumed by motion control board 54 is to send a new configuration setting to e-fuse 118*b*. The new configuration setting limits the maximum amount of current that e-fuse 118*b* will allow through it before tripping, thereby either shutting off power to the motion control board 54 when the current exceeds the limit, or limiting the current flow to the maximum limit. The configuration setting is chosen to match the particular limit defined in step 192 (e.g. six amperes).

A third manner by which main microcontroller 82 may limit the amount of current consumed by motion control board 54 is a combination of both the first and second manners discussed above. That is, main microcontroller 82 may send a command to motion microcontroller 86 instructing it to limit its current consumption, and also send a new current limit setting to e-fuse 118*b* that causes e-fuse 118*b* to limit the power delivered to motion control board 54 to no more than the first limit. This third manner provides a level of redundancy such that, if motion microcontroller 86 is not successful at limiting its current consumption, e-fuse 118*b* is able to take over and enforce the intended current limit.

After completing step 192 (FIG. 5), main microcontroller 82 returns to step 184 of algorithm 180 and continues to execute algorithm 180 from that step. If main microcontroller 82 determines at step 188 that the current charge state of main batteries 78 is less than the first threshold, but greater than a second threshold, it proceeds to step 194. At step 194, main microcontroller 82 terminates electrical power to the electric brake 72 (meaning the brake still operates, but must be activated or deactivated manually), the pendant 74, motion control board 54, room interface board 62, siderail control boards 64*a-b* and 66*a-b*, and propulsion control board 60. Each of these boards and devices is therefore no longer operable when the charge state of batteries 78 falls below this second threshold. From step 194, main microcontroller 82 returns back to step 186 and continues to execute algorithm 1890.

If main microcontroller 82 determines at step 188 that the state of charge of the main batteries 78 is less than the second threshold, it proceeds to step 196 where it shuts down control system 50, including display control board 56 (which it doesn't shut down at step 194). Thus, if the charge state of main batteries 78 falls below the second threshold, control system 50 shuts down completely and can no longer be used. In order to re-start control system 50, patient support apparatus 20 must be plugged back into an external source of electrical power (e.g. plug 110 is coupled to an AC outlet).

It will be understood by those skilled in the art that the particular thresholds used by main microcontroller 82 at step 188 may be varied considerably. In one embodiment, the first threshold is fifty percent and the second threshold is forty-percent. In this particular embodiment, all of the components of control system 50 except mattress control board 58 are operable when main batteries 78 are charged above fifty percent of their capacity, and only those components not mentioned at step 194 (e.g. display control board 56) remain operable when the batteries 78 are charged between forty to fifty percent of their capacity. Below forty percent, control system 50 shuts down. Other thresholds may be used.

Turning to step 190 of power distribution algorithm 180 (FIG. 5), main microcontroller 82 determines if the mattress control board 58 is currently providing a mattress therapy to the patient or not. If the mattress is in a non-therapy state, main microcontroller 82 proceeds to step 198. At step 198, main microcontroller 82 sets the maximum amount of electrical current that motion control board 54 may utilize to a second limit. In the particular example shown in FIG. 5, the second limit is set to fourteen amperes, although it will be understood that this may be varied in different embodiments. Main microcontroller 82 implements this second limit in any of the manners previously described (e.g. by sending a current-limiting command to motion microcontroller 86, by sending a new maximum current configuration setting to e-fuse 118*b*, and/or by doing both). From step 198, main microcontroller 82 returns back to step 184 of algorithm 180.

If main microcontroller 82 determines at step 190 that the mattress is currently in a therapy state, it proceeds to step 200. At step 200, main microcontroller 82 sets the maximum amount of electrical current that motion control board 54 may utilize to a third limit. In the particular example shown in FIG. 5, the third limit is set to eight amperes, although it will be understood that this may be varied in different embodiments. In general, however, the third limit will fall somewhere between the first limit of step 192 and the second limit of step 198. Main microcontroller 82 implements this third current limit in any of the manners previously described (e.g. by sending a current-limiting command to motion microcontroller 86, by sending a new maximum current configuration setting to e-fuse 118*b*, and/or by doing both). From step 200, main microcontroller 82 returns back to step 184 of algorithm 180.

It can be seen that power distribution algorithm 180 therefore reduces the amount of electrical power available to the motorized actuators 84 to a first limit when the patient support apparatus 20 is operating on battery power, and increases the amount of electrical power available to the motorized actuators when operating on AC power. Further, the increase in electrical power to the actuators 84 is greater when the mattress is not providing therapy to the patient than when the mattress is being used to provide therapy. The limits on the power available to motion control board 54 set forth in algorithm 180 are implemented in order to account for the fact that motorized actuators 84 are typically the biggest consumers of electrical power out of all of the components of patient support apparatus 20, and therefore need to be operated in a controlled manner in order to ensure that sufficient power remains for other functions, such as, but not limited to, mattress therapies.

It will be understood by those skilled in the art that power distribution algorithm 180 may be modified in a number of different manners. For example, in one modified embodiment, only a single threshold is used at step 188. In this modified embodiment, if the charge state of the main batteries 78 is above that single threshold, main microcontroller 82 proceeds to step 192. If the charge state of the main batteries 78 is below that single threshold, main microcontroller 82 proceeds to step 196. Thus, in this modified embodiment, step 194 is omitted and microcontroller 82 either braches to step 192 or to step 196 from step 188.

It will also be understood that power distribution algorithm 180 may be modified to take into account the charge state of propulsion batteries 112. In the example shown in FIG. 5, algorithm 180 does not utilize the charge state of propulsion batteries 112 because those batteries 112 are reserved for providing power to propulsion motors 114 and propulsion control board 60. However, in at least one modified embodiment, the circuitry of control system 50 may be modified to allow propulsion batteries to supply electrical power to main control board 52, and power algorithm 180 may be modified to take into account this source of electrical power. In this modified embodiment, power algorithm 180 controls the distribution of power based not only on the charge state of main batteries 78, but also the charge state of propulsion batteries 112.

Figure 6:
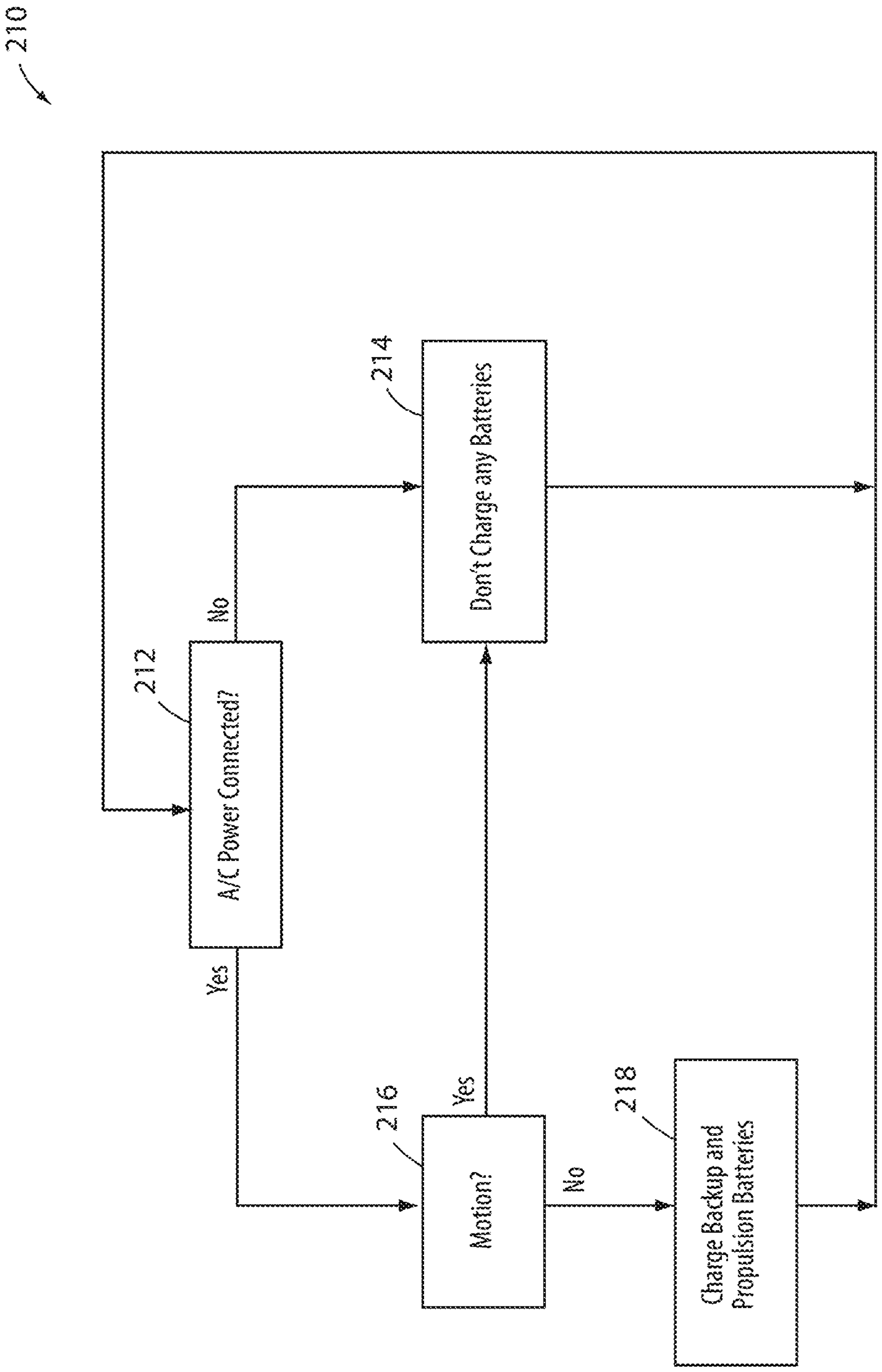
FIG. 6 is a flowchart of a charging algorithm used by the microcontroller of the control system to manage the charging of one or more batteries on the patient support apparatus.

FIG. 6 illustrates a charging algorithm 210 following by main microcontroller 82. Main microcontroller 82 begins algorithm 210 at step 212 where it determines if an external AC power source is connected to patient support apparatus 20 or not. Step 212 is performed in the same manner as step 186 of algorithm 180. If no external AC power source is coupled to patient support apparatus 20, main microcontroller 82 proceeds to step 214 where none of the batteries (main batteries 78 and propulsion batteries 112) are recharged. From step 214, main microcontroller 82 returns to step 212. If main microcontroller 82 determines that the patient support apparatus 20 is receiving electrical power from an external AC source at step 212, it proceeds to step 216. At step 216, main microcontroller 82 determines if any of actuators 84*a-d* are being driven or not. If any actuators 84*a-d* are currently being driven, main microcontroller 82 proceeds to step 214 and pauses, or stops, the charging of both main batteries 78 and propulsion batteries 112. If no actuators 84 are being driven, main microcontroller 82 proceeds to step 218 and starts and/or continues the charging of both main batteries 78 and propulsion batteries 112.

By following charging algorithm 210, main microcontroller 82 ensures that the electrical power consumed in the charging of batteries 78 and 112 is temporarily paused whenever an actuator 84*a-d* is activated, thereby making the power that would otherwise be used for charging the batteries available to drive the actuator. In this manner, the driving of the motorized actuators 84 is not slowed down, or otherwise done with any less power. Instead, only the charging of the batteries, which is a process not perceptible to a user, is temporarily interrupted. Once the actuator(s) are done moving, the charging resumes.

Together, power distribution algorithm 180 and charging algorithm 210 enable patient support apparatus 20 to be supplied by a power supply 76 having a maximum capacity that is less than the total needs of patient support apparatus 20 were control system 50 to operate all of its components simultaneously. In other words, power supply 76 has a maximum power output that is less than the total power consumption of all of the components of control system 50 when summed together. In one embodiment, power supply 76 may be a 600 watt power source and the combined consumption of control system 50 may be more than six hundred watts, particularly when motorized actuators 84 are operating, the mattress is in a therapy state, the electric brake 72 is being operated, and the other components (other than propulsion motors 114) of control system 50 are active. By using a power supply 76 having a capacity less than what is required by control system 50 when fully operational, patient support apparatus 20 is able to use a less costly and less bulky power supply 76. Further, by using the electrical power distribution structures and algorithms disclosed herein, the impact of the reduced power supply 76 on the operation of control system 50 is reduced and/or not apparent to the user.

It will be understood that in some embodiments of control system 50, main microcontroller 82 does not implement both algorithms 180 and 210, but instead only implements a single one of these algorithms. Further, it will be understood that in other embodiments of control system 50, main microcontroller 82 may implement other power consumption and/or distribution algorithms, either in lieu of, or in addition to, algorithms 180 and 210. For example, in one such modified embodiment, main microcontroller sends out sleep commands to one or more of the boards 54-66 at certain times in order to put the associated microcontroller and other components of the board to sleep. In one of these embodiments, patient support apparatus 20 includes one or more siderail position sensors that determine whether each siderail 34 is in an up or down position. When it is in a down position, main microcontroller 82 sends a sleep command to the siderail microcontroller(s) associated with the lowered siderail. For example, if the right head end siderail is lowered, main microcontroller 82 sends a sleep command to the right siderail microcontroller(s) 162 of right siderail control boards 64*b* and 66*b* (FIG. 2). When the right head end siderail is moved to a raised position, main microcontroller 82 sends a wake command to the transceivers 144 of those boards 64*b* and 66*b* which, as noted above, wakes up the corresponding microcontroller. In this manner, whenever a siderail is lowered, the power consumed by the microcontroller associated with the control panel(s) on the lowered siderail is put into a sleep state.

In another modified embodiment of patient support apparatus 20, main microcontroller 82 is configured to put the microcontrollers associated with patient control panels 48*b* to sleep whenever a patient is not present on patient support apparatus 20. In this embodiment, patient support apparatus 20 is constructed with one or more patient presence sensors that indicate to main microcontroller 82 whether the patient is present or not. When the patient is determined to not be present, main microcontroller 82 sends a sleep command to left patient control board 64*a* and right patient control board 64*b*. When the patient returns to patient support apparatus 20, main microcontroller 82 sends a wake command to the transceivers of left patient control board 64*a* and right patient control board 64*b*, thereby waking up the corresponding microcontrollers and returning functionality to both patient control panels 48*b*.

When patient support apparatus 20 is configured to include one or more patient presence sensors, such sensors may take on a variety of different forms. In some embodiments, the patient presence sensors are adapted to detect one or more vital signs of the patient when the patient is supported on patient support apparatus 20. In such embodiments, the detection of a patient's vital sign is used as confirmation of the patient's presence, and the absence of a detected vital sign is interpreted as the patient being absent. Several methods and sensors for detecting a patient's vital signs are disclosed in commonly assigned U.S. patent application Ser. No. 62/253,167, filed Nov. 10, 2015, by inventors Marko Kostic et al. and entitled PERSON SUPPORT APPARATUSES WITH ACCELERATION DETECTION, the complete disclosure of which is incorporated herein by reference. A patient's breathing rate and/or heart rate may also be detected using load cells 80, such as is disclosed in commonly assigned U.S. Pat. No. 7,699,784 issued to Wan Fong et al. and entitled SYSTEM FOR DETECTING AND MONITORING VITAL SIGNS, the complete disclosure of which is hereby incorporated herein by reference. Still other methods and/or sensors can be used to detect a patient's vital signs, and thereby determine if a patient is present on patient support apparatus 20 or not.

Detecting a patient's vital signs may also be performed in other manners. For example, in some embodiments, the patient presence sensors are incorporated into the mattress, such as a mattress of the type disclosed in commonly assigned U.S. patents application Ser. No. 13/836,813 and Ser. No. 61/697,10, entitled INFLATABLE MATTRESS AND CONTROL METHODS and PATIENT SUPPORT, respectively, the former of which was filed Mar. 15, 2013 and the latter of which was filed Sep. 5, 2012, the complete disclosures of both of which are hereby incorporated herein by reference. When incorporated into a mattress, the patient presence sensor, in some embodiments, detects respiration and/or heart rates by a pressure sensor included within the mattress that detects fluid pressure changes within one or more bladders contained within the mattress. Such fluid pressure changes are filtered for frequencies within those of the normal heart rate and breathing rate and processed, such as through Fourier analysis, or otherwise, to yield a heart rate and/or respiration rate. In embodiments using the mattress construction disclosed in the above-referenced Ser. No. 13/836,813 and/or 61/697,10 applications, the mattress also includes a plurality of depth sensors that measure the depth which the patient has sunk into the mattress. These depth sensor signals may be combined with the air pressure signals to determine a patient's breathing rate and or heart rate.

In other embodiments, the patient presence sensors are implemented to detect the patient's presence/absence in manners that don't involve the detection of vital signs. For example, in some embodiments, the patient presence sensors include one or more thermal sensors that detect the absence/presence of the occupant and/or the position of the occupant's head on the personal support apparatus 20. Further details of such a thermal sensing system are disclosed in commonly assigned U.S. patent application Ser. No. 14/692,871 filed Apr. 22, 2015, by inventors Marko Kostic et al. and entitled PERSON SUPPORT APPARATUS WITH POSITION MONITORING, the complete disclosure of which is incorporated herein by reference.

In still other embodiments, the patient presence sensors are configured to detect the absence or presence of an occupant using one or more of the methods disclosed in commonly assigned U.S. patent application Ser. No. 14/928,513 filed Oct. 30, 2015, by inventors Richard Derenne et al. and entitled PERSON SUPPORT APPARATUSES WITH PATIENT MOBILITY MONITORING, the complete disclosure of which is also hereby incorporated herein by reference. In still other embodiments, the patient presence sensors include one or more video and/or infrared cameras detecting an occupant's presence, absence, and/or position, such as disclosed in commonly assigned U.S. patent application Ser. No. 14/578,630 filed Dec. 22, 2014, by inventors Richard Derenne et al. and entitled VIDEO MONITORING SYSTEM, the complete disclosure of which is also hereby incorporated herein by reference. Such cameras are positioned on the patient support apparatus 20 in some embodiments; positioned off- board the patient support apparatus 20 in other embodiments; and include both one or more on-board cameras and one or more off-board cameras in still other embodiments.

In yet another alternative embodiment, the patient presence sensors sense the presence, absence, and/or position of an occupant using a pressure sensing mat on which, or above which, the patient lies. The pressure sensing mat may be positioned on top of, or underneath, the mattress on support deck 30, such as is disclosed in commonly assigned U.S. patent application Ser. No. 14/003,157 filed Mar. 2, 2012, by inventors Joshua Mix et al. and entitled SENSING SYSTEM FOR PATIENT SUPPORTS, the complete disclosure of which is also incorporated herein by reference. This pressure sensing mat is also able to detect the overall shape of the patient's weight or the object's weight (e.g. the weight footprint) when positioned on the mattress. This overall shape is processed by main microcontroller 82, or a controller within the flexible pressure sensing mat, to determine whether the shape corresponds to a human or an object. The result of this determination is used by main microcontroller 82 to distinguish between the objects and humans moving onto or off the patient support apparatus, and to control the power distribution to patient control panels **48*b*** accordingly.

In yet another embodiment, the patient presence sensors are adapted to detect a bracelet, tag, or other radio-frequency object worn by the patient using one or more near field transceivers incorporated into patient support apparatus 20. Such sensors are able to communicate via near field communication with near field tags, bracelets, etc. worn by the patients. Examples of near field transceivers that may be incorporated into patient support apparatuses and used to detect patient-worn tags, bracelets, etc. are disclosed in commonly assigned U.S. patent application Ser. No. 13/802,992, filed Mar. 14, 2013 by applicants Michael Hayes et al., and entitled COMMUNICATION SYSTEMS FOR PATIENT SUPPORT APPARATUSES, the complete disclosure of which is hereby incorporated herein by reference. Still other types of sensors that detect the patient's presence in other manners may be used.

In yet another modified embodiment of patient support apparatus 20, main microcontroller 82 is configured to put the microcontroller associated with foot end control panel **48*a* asleep whenever a lid on that control panel 48*a* is flipped down, thereby covering all or a majority of the control panel 48*a*. That is, main microcontroller 82 sends a sleep command to display microcontroller 88 of display control board 56 when a lid covering the display is flipped down, and sends a wake command to the display transceiver 144*c* when the lid is flipped up. This reduces the power consumed by the display control board 56** when the display is not visible.

In yet another modified embodiment of patient support apparatus 20, main microcontroller 82 is configured to put the display microcontroller 88 of display control board 56 asleep whenever a caregiver's presence is not detected in the vicinity of patient support apparatus 20. In this modified embodiment, control system 50 reduces its energy consumption by not powering display microcontroller 88-which controls a display 90 intended for viewing by the caregiver-when the caregiver is absent. In such embodiments, the detection of the presence or absence of the caregiver is carried out by one or more caregiver detection sensors that may be implemented in a variety of different manners. For example, in some embodiments, the caregiver presence sensors include one or more near field sensors that are adapted to detect near field cards, tags, or the like that are carried by caregivers. In another embodiment, the caregiver presence sensors are RF ID sensors that are adapted to detect RF ID cards, tags, or the like that are worn or carried by caregivers. In still another embodiment, patient support apparatus 20 includes one or more cameras (visible light and/or infrared light) that have fields of view in the areas adjacent patient support apparatus 20 and are able to detect the presence of a caregiver within those fields of view. One example of a patient support apparatus 20 having such cameras built into it is found in commonly assigned U.S. Pat. No. 9,814,410 issued to Kostic et al. and entitled PERSON SUPPORT APPARATUS WITH POSITION MONITORING, the complete disclosure of which is incorporated herein by reference. In still other embodiments, one or more caregiver presence sensors may be added to the environment of patient support apparatus 20 and their results are then sent to main microcontroller 82 via network transceiver board 92, or one of the other transceivers on-board patient support apparatus 20. For example, one or more cameras may be positioned within the room in which patient support apparatus 20 is located and adapted to capture images of the caregivers, when present, and report that information either directly to patient support apparatus 20, or indirectly via a patient support apparatus server that acts as an intermediary device. One such suitable camera system is disclosed in commonly assigned U.S. Pat. No. 10,121,070 issued to Derenne et al. and entitled VIDEO MONITORING SYSTEM, the complete disclosure of which is incorporated herein by reference. Still other types of caregiver presence detectors may be utilized, either in lieu of, or in addition to, those discussed above.

It will be understood that patient support apparatus 20 may be further configured to put to sleep one or more other ones of the microcontrollers of control system 50 in response to still other conditions or situations, and/or it may be further configured to put to sleep those microcontrollers discussed above in response to still other criteria. In any of the embodiments in which main microcontroller 82 is configured to send a sleep command to a microcontroller, main microcontroller 82 may be programmed to only send such a sleep command when the patient support apparatus 20 is operating on battery power (and meets the other conditions for such a sleep commend). In this manner, sleep commands are only sent when the patient support apparatus 20 is operating on battery power, and are not sent when the patient support apparatus 20 is operating on an external AC power source. Thus, for example, microcontroller 82 may be programmed to send sleep commands to one or more of the microcontrollers of the control panels 48 when operating on battery power and when no patient is present or no caregiver is present, and to allow microcontrollers of the control panels 48 to remain awake when patient support apparatus 20 is operating on an external AC power source, regardless of the patient's and/or caregiver's presence or absence.

Figure 7:
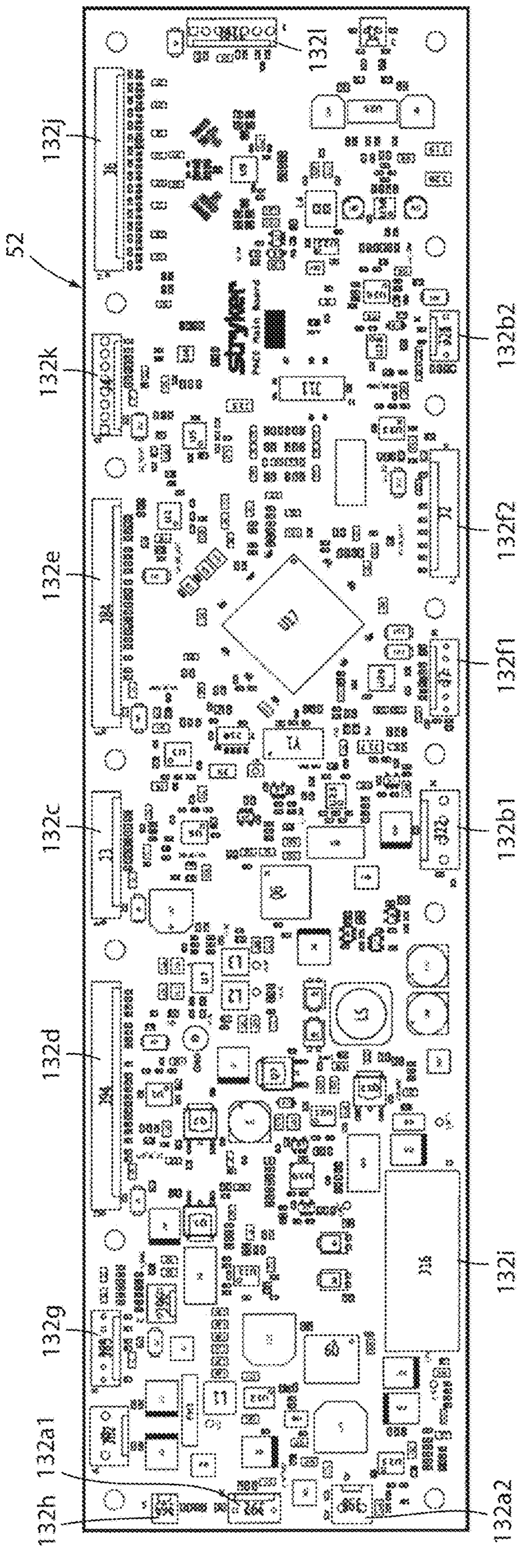
FIG. 7 is a plan view of one embodiment of a main control board of the control system showing differently keyed electrical connectors for coupling the main control board to other components of the control system.

FIG. 7 illustrates an illustrative topography of one embodiment of main control board 52. FIG. 7 also illustrates the connectors 132 incorporated into main control board 52. More specifically, in addition to the connectors 132*a-g* shown and discussed above with respect to FIG. 3, FIG. 7 also shows connectors 132*h-l*. Further, FIG. 7 shows an embodiment of main control board 52 in which mattress connector 132*a* is split up between two connectors 132*a*1 and 132*a*2. First mattress connector 132*a*1 connects the communication lines between main control board 52 and mattress control board 58, while second mattress connector 132*a*2 connects the power lines between main control board 52 and mattress control board 58. Similarly, the embodiment of main control board 52 shown in FIG. 7 divides the motion control board connector 132*b* into two separate connectors: first motion control connector 132*b*1 connects the power lines from main control board 52 to motion control board 54 and second motion control connector 132*b*2 connects the communication lines between main control board 52 and motion control board 54. Main control board 52 of FIG. 7 also includes two room interface board connectors 132*f*1 and 132*f*2. Only one of these is used at a given time for a particular patient support apparatus 20, depending upon which type of room interface board 62 is installed in that particular patient support apparatus 20.

Connector 132*h* (FIG. 7) receives a cable that connects main control board 52 to an emergency CPR switch that is activated when a person wishes to immediately drop head section 40 to a lowered positioned in which CPR can be more effectively implemented. Connector 132*i* receives a cable that couples main control board 52 to power supply 76. Connector 132*j* receives a cable that couples main control board 52 to load cells 80. Connector 132*k* receives a cable that couples main control board 52 to pendant 74. Connector 1321 receives a cable that connects main control board 52 to the propulsion user interface 94 (note: in this embodiment, the propulsion user interface feeds into main control board 52 rather than to propulsion microcontroller 150 of propulsion control board 60. Either arrangement may be used.)

From the embodiment shown in FIG. 7, it can be seen that the size, shape, pin number, and/or pin arrangement of each of the connectors 132 is unique from each other, thereby ensuring that, during assembly of patient support apparatus 20, cables are not inadvertently routed to the wrong board or other component of control system 50. This is true not only for the boards of control system 50 that communicate with main control board 52, but also all of the other electrical components that communicate with control system 50, including, but not limited to, power supply 76, the patient pendant 74, the load cells 80, etc. Control system 50 is therefore designed to help reduce mistakes that otherwise might be made during the assembly process of patient support apparatus 20.

Figure 8:
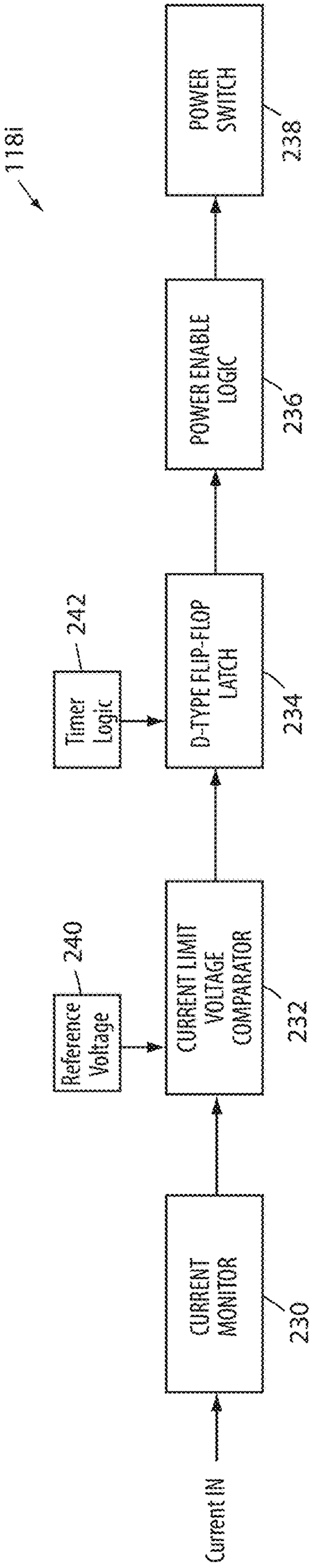
FIG. 8 is a block diagram of several circuits of a high current electronic fuse that may be used in one or more embodiments of the present disclosure.

FIG. 8 shows a block diagram of one embodiment of a high-current e-fuse 118*i*. In some embodiments, it is desirable to use an e-fuse 118 that is capable of handling larger amounts of electrical current, such as, but not limited to, current levels of up to fifteen amperes or more. For example, such a high current e-fuse 118 may be desirable for use with motion control board 54 instead of e-fuse 118*b* because motion control board 54, when activating all of the actuators 84 simultaneously, may draw nearly fifteen amperes of current. Alternatively, or additionally, such a high current e-fuse 118 may be used by propulsion control board 60 for controlling the propulsion motor. Still other uses for such a high current e-fuse 118 may be desirable. In any of these situations where a relatively high current limit is desired, e-fuse 118*i* may be used. Alternatively, another type of high current e-fuse may be used.

E-fuse 118*i* includes five main circuit components: a current monitor circuit 230, a comparator circuit 232, a latch circuit 234, a power enable circuit 236, and a power switch circuit 238. Current monitor circuit 230 monitors the amount of current that is being delivered to the downstream load (e.g. motion control board 54, in at least one embodiment). The amount of current being delivered is fed to comparator circuit 232 which compares it to a maximum current threshold. The maximum current threshold defines when the e-fuse will trip (i.e. if the current delivered exceeds the maximum current threshold, e-fuse 118*i* trips; if it does not, e-fuse 118*i* does not trip). In at least one embodiment where e-fuse 118*i* is used for limiting power to motion control board 54, the maximum current threshold may be set to twenty-amperes, although other maximum current thresholds may be used. Whatever the specific value utilized, the value is defined by reference voltage 240 and may be dynamically adjusted by main microcontroller 82 by changing the reference voltage

240 and/or by changing the scaling of the input voltage that is compared to the reference voltage 240.

If comparator circuit 232 detects that the current being delivered exceeds the maximum current threshold, it outputs a signal to latch circuit 234. Latch circuit 234 sets a latch when the e-fuse 118*i* is tripped (e-fuse 118*i* is not configured to automatically retry after it trips, but instead must be reset manually). Latch circuit 234 is configured to set the latch after a slight delay in order to accommodate excessive in-rush current. The amount of this delay is defined by timer logic 242. The output of latch circuit 234 is fed into a power enable circuit 236 that terminates power to the downstream load whenever either or both of the following two conditions are met: latch circuit 234 is tripped or main microcontroller 82 sends a command to e-fuse 118*i* to terminate power to the downstream load. The output of the power enable circuit 236 is fed to a power switch circuit 238 that delivers the power to the downstream load (when e-fuse 118*i* has not been tripped).

Figure 9:
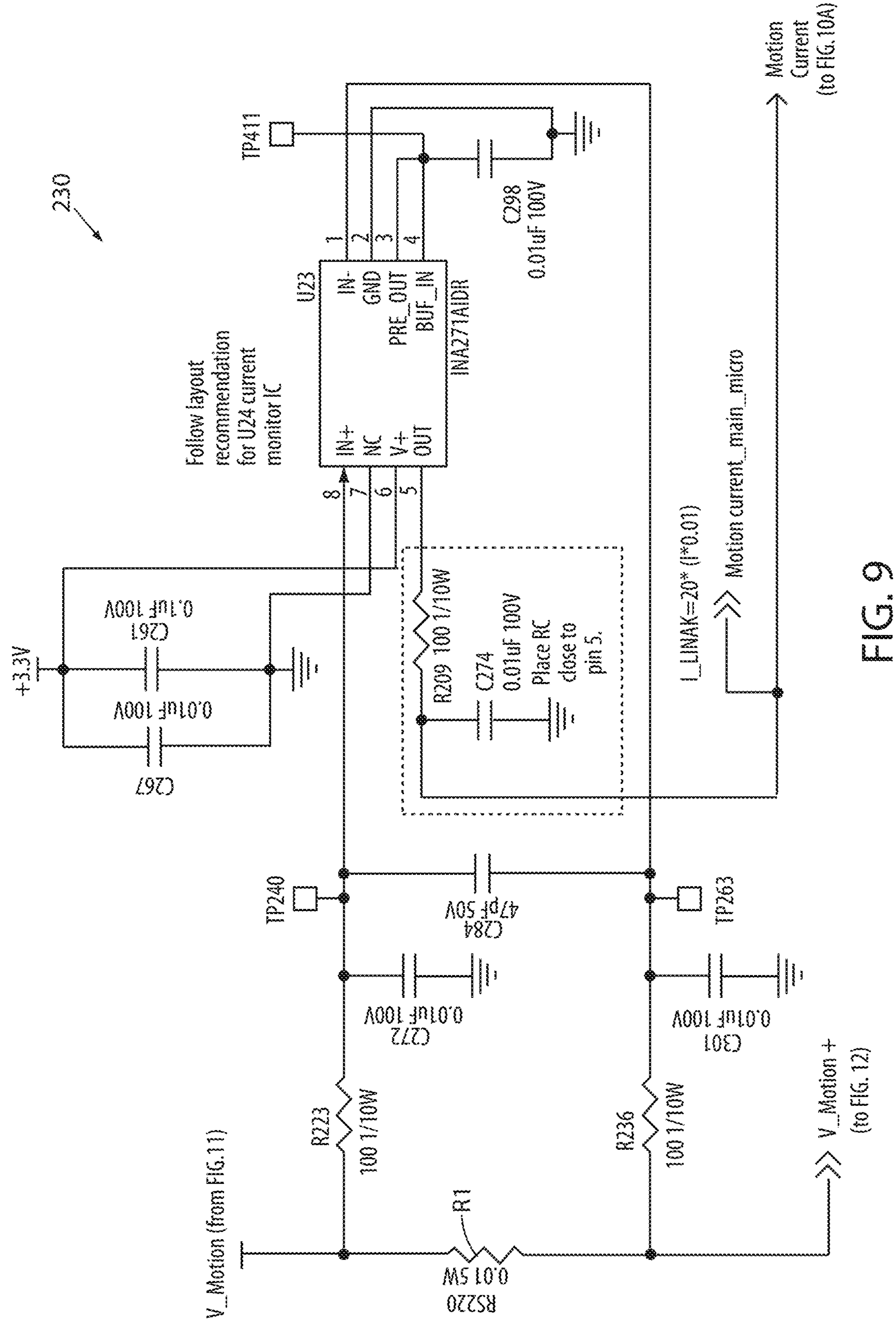
FIG. 9 is a circuit diagram of the current monitor circuit of FIG. 8.
Figure 10A:
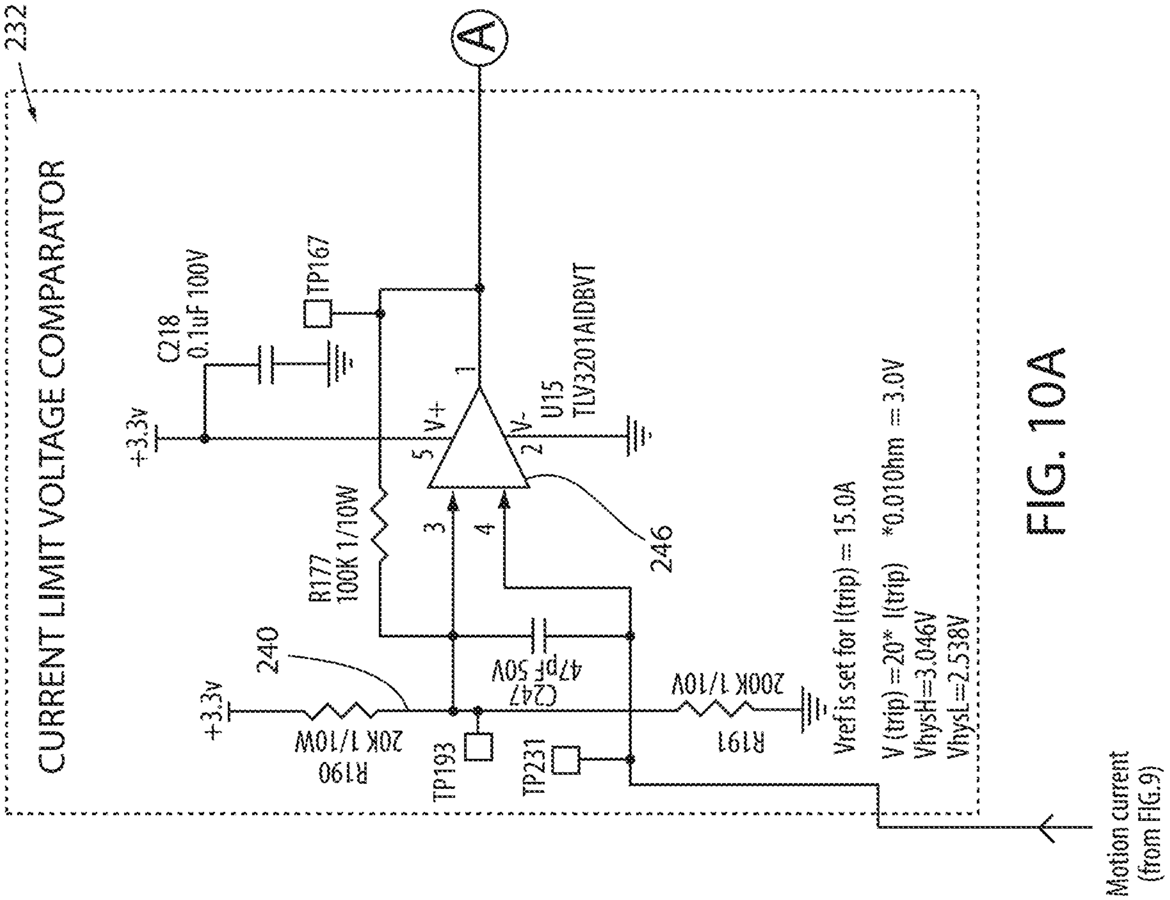
FIG. 10A is a first portion of a circuit diagram of the current comparator circuit and the flip-flop circuit of FIG. 8.
Figure 10B:
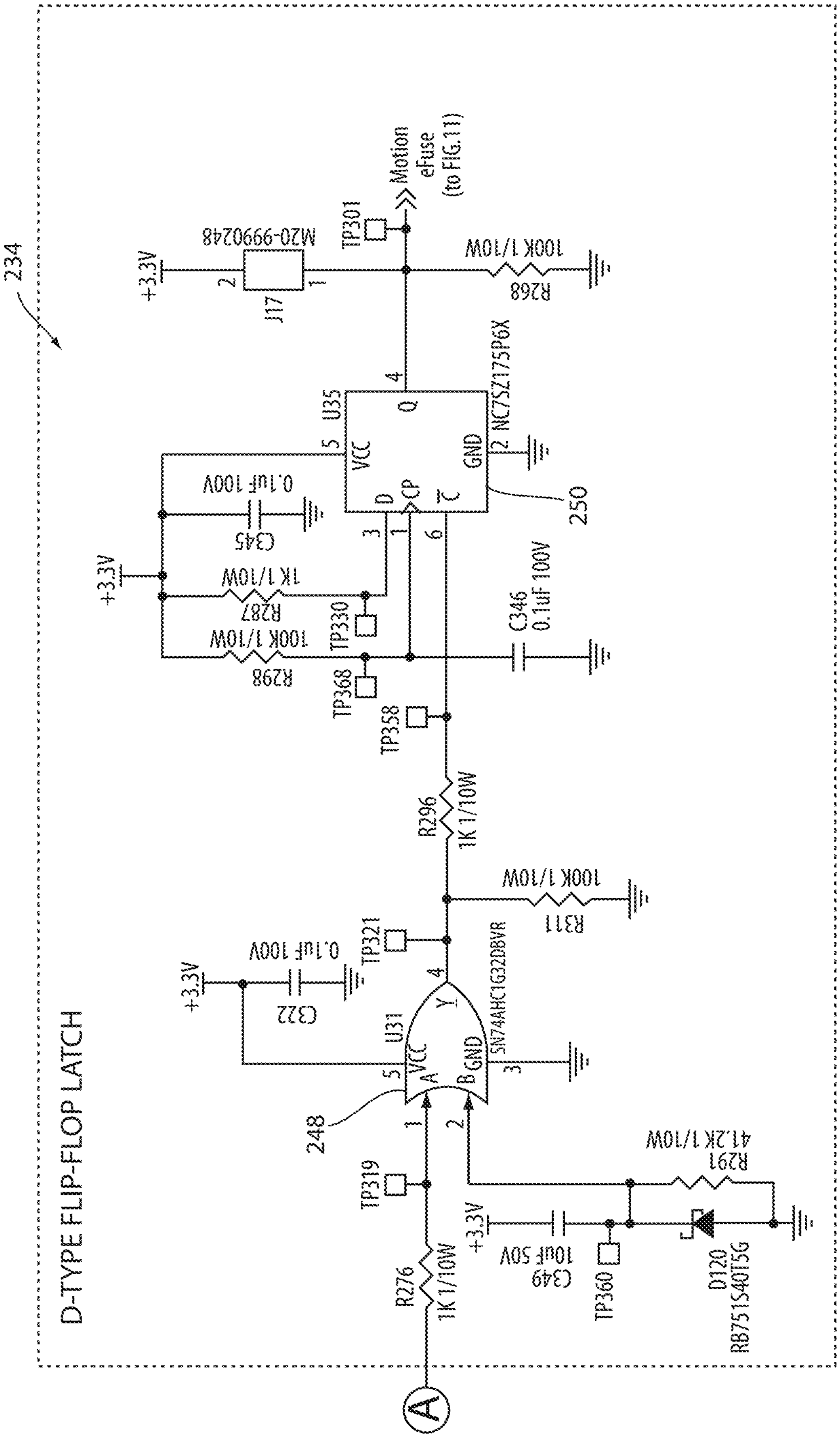
FIG. 10B is a second portion of the circuit diagram of FIG. 10A.
Figure 11:
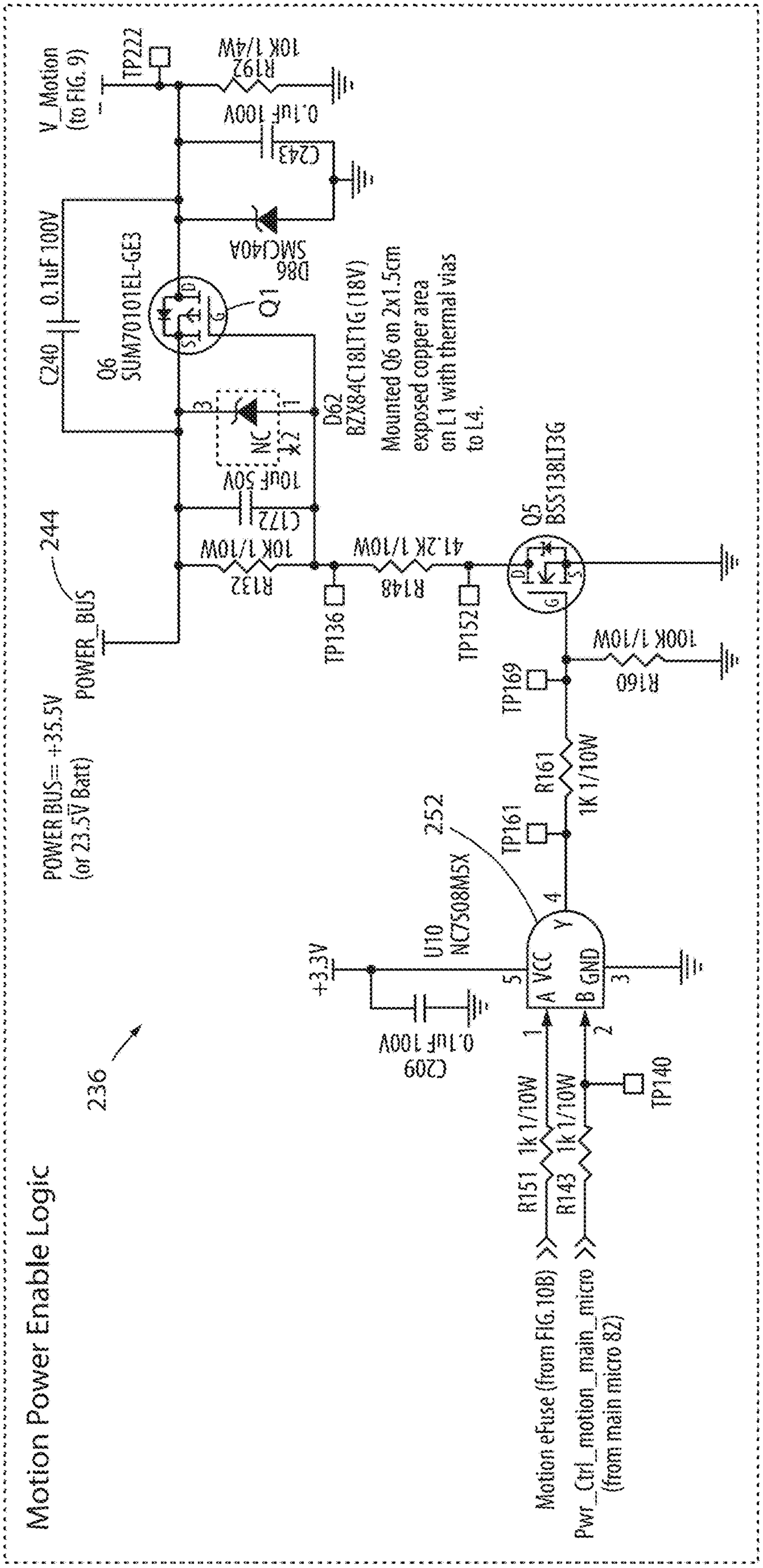
FIG. 11 is a circuit diagram of the power enable logic circuit of FIG. 8.
Figure 12:
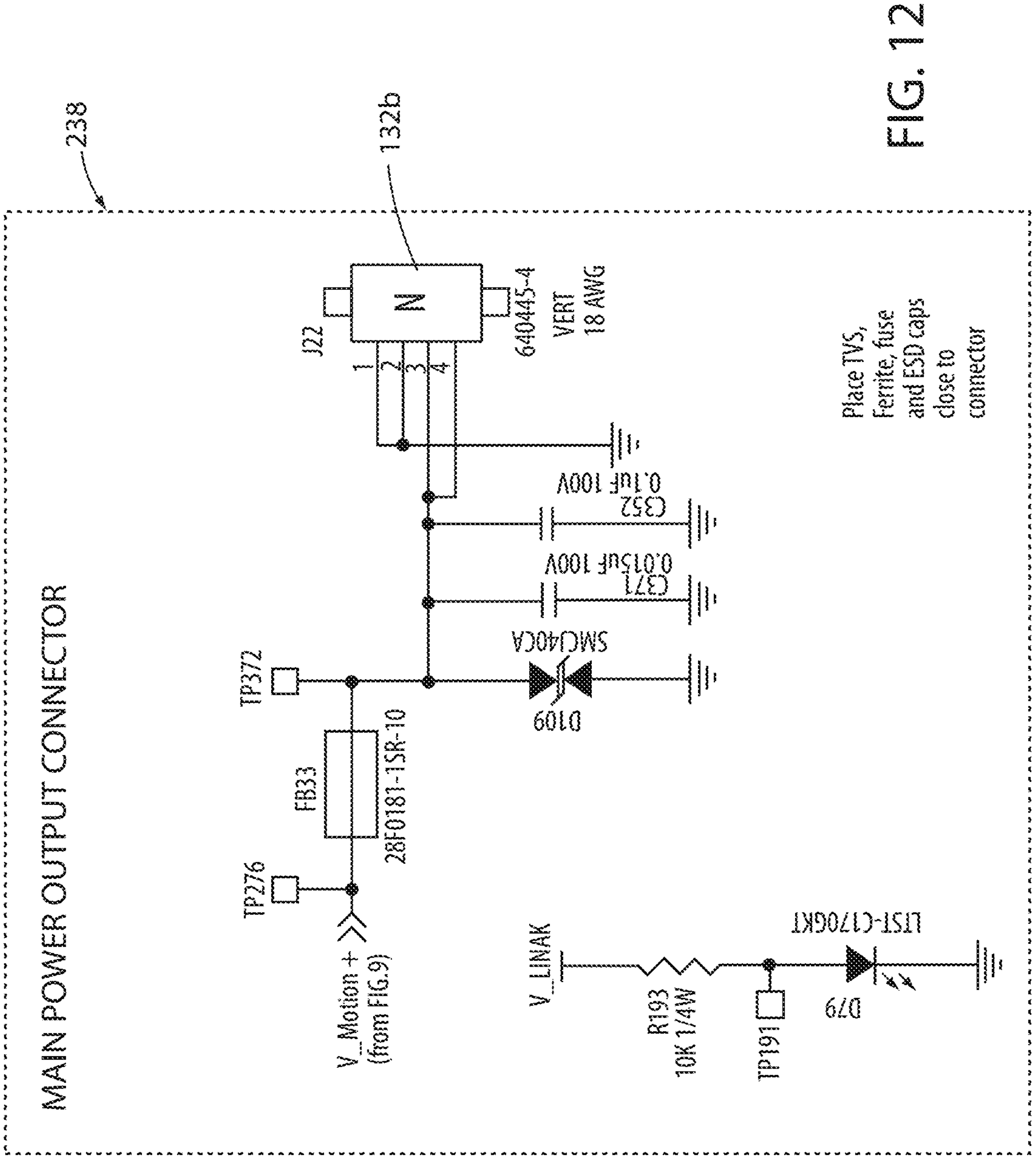
FIG. 12 is a circuit diagram of the power switch circuit of FIG. 8.

FIGS. 9-12 illustrate in greater detail one example of each of the circuits 230-238 of e-fuse 118*i*. More specifically, FIG. 9 illustrates one embodiment of current monitor circuit 120; FIG. 10 illustrates one embodiment of each of comparator circuit 232 and latch circuit 234; FIG. 11 illustrates one embodiment of power enable circuit 236; and FIG. 12 illustrate one embodiment of power switch circuit 238.

Turning first to FIG. 9, comparator circuit 232 receives a voltage input that is labeled V_Motion. This input is received from the V_Motion output of power enable circuit 236 (FIG. 11). As can be seen from power enable circuit 236 of FIG. 11, V_Motion is coupled by a transistor Q1 to the power bus 244. Power bus 244 is, in at least one embodiment, received directly from power supply 76 and, in some embodiments, may be equal to approximately 36 volts (when operating on AC power) or 24 volts (when operating on battery power). Q1, in conjunction with Q2, is used to control when e-fuse 118*i* trips. That is, Q1 remains in an on-state when e-fuse 118*i* has not tripped, and shuts off when e-fuse 118*i* trips.

Returning to FIG. 9, current monitor circuit 230 feeds the V_Motion input into a low value resistor R1 and the voltage drop across resistor R1 is measured by the remaining circuitry of monitor circuit 230 and converted into a current reading. The current reading is output to two different structures. A first output, which is labeled as "Motion current_main_micro" in FIG. 9 is fed to the main microcontroller 82 so that main microcontroller is apprised of the amount of electrical current being delivered to the downstream load. A second output, which is labeled "motion current" in FIG. 9 is fed to comparator circuit 232 of FIG. 10. Current monitor circuit 230 also feeds the current passing through resistor R1 to power switch circuit 238 of FIG. 12 (via the line labeled "V_Motion +").

Comparator circuit 232 of FIG. 10 includes a comparator 246 that compares the motion current reading from FIG. 9 to the reference voltage that defines the maximum current threshold. The output of this comparison is fed to an OR gate 248 whose output is further fed to a D-type flip flop 250. The output of the D-type flip flop 250, which is labeled "Motion eFuse," is fed into an AND gate 252 of power enable circuit 236 (FIG. 11). AND gate 252 of power enable circuit 236 controls the state of transistors Q1 and Q2 which, as noted previously, control whether e-fuse 118*i* allows current to the downstream load or shuts off such current. In addition to receiving the "motion eFuse" input from FIG. 10, AND gate 252 receives an input labeled "Pwr_Ctrl_motion_main_micro" from main microcontroller 82. AND gate 252 therefore controls the states of transistors Q1 and Q2 based upon two inputs: microcontroller 82 and the amount of current being delivered to the downstream load. E-fuse 118*i* can therefore be tripped by a signal from microcontroller 82 (via the line labeled "Pwr_Ctrl_motion_main_micro"), or it can be tripped when the current exceeds the maximum current threshold, which changes the "motion eFuse" input into AND gate 252. E-fuse 118*i* can therefore be shut down by main microcontroller 82 even in situations where the amount of electrical current being delivered to the downstream load is less than the maximum current threshold.

The power delivered to the downstream load of e-fuse 118*i* is delivered by power switch circuit 238 of FIG. 12. As can be seen from this circuit, the delivered power is fed to connector 132*b*, which is adapted to be coupled to one end of cable 134*b* (and the other end couples to motion control board 54). If e-fuse 118*i* is to be used for limiting the power delivered to another control board, power switch circuit 238 can be modified so that it is coupled to a connector different from connector 132*b*.

It will be understood by those skilled in the art that various modifications may be made to the functions and structures disclosed herein. Such modifications include, but are not limited to, implementing only a selected one, or other subset, of the features and functions described herein. For example, in some embodiments, patient support apparatus 20 may be configured to implement any of the power saving algorithms disclosed herein without utilizing the unique connectors 132. As another example, patient support apparatus 20 may be implemented without using any of the e-fuses disclosed herein, and instead control the distribution of electrical power to the components of control system 50 in any of the other manners discussed herein. As yet another example, control system 50 may be implemented without using any of the wake and sleep commands disclosed herein, and instead control the distribution of electrical power in the other manners described herein. Still other modifications are possible.

In yet another embodiment, main microcontroller 82 may be programmed with data indicating how much power each component of control system 50 draws, as well as the maximum amount of power that can be supplied by power supply 76. When equipped with this data, main microcontroller 82 can be programmed to back calculate how much power a particular action is going to require in response to a user input, determine how much power is currently being used, and determine (using the maximum amount of power that can be supplied by power supply 76) if there is sufficient power capacity to fully supply the requested action. If there is, main microcontroller 82 allows the requested action to take place. If there is not sufficient power, main microcontroller 82 consults a look up table that prioritizes what actions receive power and reacts to the requested action by distributing power in accordance with the priority look-up table. The priority look up table may also specify taking additional actions such as, but not limited to, any of the actions set forth above in algorithms 180 and/or 210. In this manner, main microcontroller 82 may be programmed to dynamically shift electrical power to those components that have priority in response to changing power demands.

In any of the embodiments discussed above, main microcontroller 82 may further be programmed with the minimum amount of power needed by each of the control boards to perform each of the actions carried out by the respective control board. Using this minimum power information, main microcontroller 82 is programmed to not send a power-limiting command to a control board that restricts the power to a level that is insufficient for the control board to carry out one or more of its functions. Further, main microcontroller 82 is programmed to use this information in order to determine the minimum power necessary to carry out a particular function and, if necessary, temporarily reduce power consumption elsewhere in order to carry out that particular function (depending upon the power prioritization data that has been programmed into main microcontroller 82).

Thus, main microcontroller 82 is programmed with information indicating the minimum amount of electrical power needed by, for example, motion control board 54 to drive each of the actuators 84. If actuator movement is desired while motion control board 54 is operating in a power-reduced state (e.g. it has received a command to limit its power from main microcontroller 82), main microcontroller does not send the movement command to motion control board 54 unless motion control board 54 has sufficient electrical power to carry out the movement. Alternatively, regardless of whether motion control board 54 has any power restrictions currently on it, main microcontroller 82 may be programmed to use the minimum power consumption data for activating an actuator to temporarily reduce power consumption elsewhere in control system 52 so that it can send the motion control command to motion control board 54 and allow it to power the actuator. Once the actuator has done moving, main microcontroller 82 may then terminate the temporary power restrictions that were implemented elsewhere in the control system 52. Main microcontroller 82 therefore is programmed not only with the maximum amount of power used by the various components of control system 52, but also the minimum amount of power necessary to carry out the various functions, and it uses the information, along with data stored in on-board memory that defines how power usage is to be prioritized, to send out commands to the appropriate control boards so that the electrical power is distributed in a manner that is both effective and in accordance with the prioritization data.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:

a litter frame;

a support deck supported on the litter frame and adapted to support a patient thereon;

a plurality of motorized actuators adapted to move a plurality of components of the patient support apparatus;

a user interface including a display for displaying information to a user;

an Alternating Current (AC) connector adapted to receive electrical power from an AC outlet;

a battery adapted to provide power to the patient support apparatus;

a main control board including a main microcontroller;

a mattress control board adapted to control a mattress positioned on top of the support deck, the mattress control board including a mattress microcontroller and a mattress transceiver adapted to receive messages from the main control board used to control the mattress;

a motion control board adapted to control movement of the plurality of motorized actuators, the motion control board including a motion microcontroller and a motion transceiver adapted to receive messages from the main control board used to control the plurality of motorized actuators; and a display control board adapted to control content displayed on the display of the user interface, the display control board including a display microcontroller and a display transceiver adapted to receive messages from the main control board used to control the display; and wherein the main microcontroller is further adapted to determine a charge state of the battery and, if the charge state is below a first threshold, to send a sleep message to at least one of the mattress transceiver, the motion transceiver, or the display transceiver, the sleep message causing the respective mattress microcontroller, motion microcontroller, or display microcontroller to shut down.

2. The patient support apparatus of claim 1 wherein the main microcontroller is further adapted to send a wake message to at least one of the mattress transceiver, the motion transceiver, or the display transceiver when the charge state of the battery exceeds the first threshold, the wake message causing the respective mattress transceiver, motion transceiver, or display transceiver to wake up the respective mattress microcontroller, motion microcontroller, or display microcontroller.

3. The patient support apparatus of claim 2 wherein the both the wake message and the sleep message are transmitted over a Controller Area Network (CAN) and the mattress transceiver, motion transceiver, and display transceiver are all CAN transceivers.

4. The patient support apparatus of claim 2 wherein, when the main control board is receiving electrical power from the battery, the main microcontroller cuts off electrical power to the mattress control board but keeps supplying electrical power to the display control board if the charge state falls below the first threshold.

5. The patient support apparatus of claim 4 wherein, when the main control board is receiving electrical power from the battery, if the charge state of the battery falls below a second threshold, the main microcontroller sends the sleep message to the motion control board and causes the motion microcontroller to shut down, the second threshold being smaller than the first threshold.

6. The patient support apparatus of claim 2 wherein, when the main control board is receiving electrical power from the battery, if the charge state of the battery falls below a second threshold, the main microcontroller sends the sleep message to the mattress control board and causes the mattress microcontroller to shut down, the second threshold being smaller than the first threshold.

7. The patient support apparatus of claim 5 wherein, when the main control board is receiving electrical power from the battery, if the charge state of the battery falls below a third threshold, the main microcontroller also sends the sleep message to the display control board and causes the display microcontroller to shut down, the third threshold lower than the first and second thresholds.

8. The patient support apparatus of claim 4 wherein the main microcontroller is further adapted to limit an amount of electrical current supplied to the motion control board to a first limit when the main control board is receiving electrical power from the AC connector, and to limit an amount of electrical current supplied to the motion control board to a second limit when the main control board is receiving electrical power from the battery, the second limit being lower than the first limit.

9. The patient support apparatus of claim 4 further comprising:

a charging circuit adapted to charge the battery when the main control board is receiving electrical power from the AC connector; and wherein the main microcontroller is further adapted to pause the charging of the battery when the main control board is receiving electrical power from the AC connector and the motion control board is driving at least one of the motorized actuators.

* * * * *